United States Patent
Erickson et al.

(10) Patent No.: US 8,289,163 B2
(45) Date of Patent: Oct. 16, 2012

(54) SIGNAL LINE STRUCTURE FOR A RADIO-FREQUENCY IDENTIFICATION SYSTEM

(75) Inventors: David P. Erickson, Stillwater, MN (US); Michele A. Waldner, Minneapolis, MN (US); James P. McGee, Cedar, MN (US); Swagata R. Banerjee, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 931 days.

(21) Appl. No.: 11/904,616

(22) Filed: Sep. 27, 2007

(65) Prior Publication Data

US 2009/0085746 A1   Apr. 2, 2009

(51) Int. Cl.
*G08B 13/14* (2006.01)

(52) U.S. Cl. .......... 340/572.1; 340/572.7; 705/22; 705/28; 343/795

(58) Field of Classification Search .... 340/572.1–572.8, 340/10.1; 343/795, 895, 741; 235/375, 385; 705/22, 28

See application file for complete search history.

(56) References Cited

U.S. PATENT DOCUMENTS

| | | | |
|---|---|---|---|
| 4,853,705 A | 8/1989 | Landt | |
| 5,182,570 A | 1/1993 | Nysen et al. | |
| 5,465,099 A | 11/1995 | Mitsui et al. | |
| 5,528,222 A | 6/1996 | Moskowitz et al. | |
| 5,574,470 A | 11/1996 | de Vall | |
| 5,771,021 A | 6/1998 | Veghte et al. | |
| 5,929,812 A | 7/1999 | Aminzadeh | |
| 5,943,022 A | 8/1999 | Massey | |
| 5,963,134 A | 10/1999 | Bowers et al. | |
| 6,031,505 A | 2/2000 | Qi et al. | |
| 6,037,879 A | 3/2000 | Tuttle | |
| 6,100,804 A | 8/2000 | Brady et al. | |
| 6,118,379 A * | 9/2000 | Kodukula et al. | 340/572.8 |
| 6,130,612 A | 10/2000 | Castellano et al. | |
| 6,147,605 A | 11/2000 | Vega et al. | |
| 6,147,655 A | 11/2000 | Roesner | |
| 6,181,287 B1 | 1/2001 | Beigel | |
| 6,184,834 B1 | 2/2001 | Utsumi et al. | |
| 6,232,870 B1 | 5/2001 | Garber et al. | |
| 6,239,753 B1 | 5/2001 | Kado et al. | |
| 6,265,977 B1 | 7/2001 | Vega et al. | |
| 6,285,342 B1 | 9/2001 | Brady et al. | |

(Continued)

FOREIGN PATENT DOCUMENTS

DE   101 36 502 A1   2/2003

(Continued)

OTHER PUBLICATIONS

Product Literature: Cuming Microwave, C-RAM SFC, Technical Bulletin 390-1, Document Control No. N-15-000-0088-J, 2 pages, Jun. 15, 2007.

(Continued)

*Primary Examiner* — Eric M Blount

(57) ABSTRACT

The invention provides one or more signal line structures that produce an electromagnetic field having a magnitude of at least an interrogation threshold of a radio frequency identification (RFID) tag for a substantial portion of an interrogation region. The signal lines may be made from copper and laid across a shelf in a storage area. The electromagnetic field may cause the tag to backscatter radio frequency (RF) signals to an RFID reader via the signal line.

21 Claims, 10 Drawing Sheets

U.S. PATENT DOCUMENTS

| | | | |
|---|---|---|---|
| 6,304,169 | B1 | 10/2001 | Blama et al. |
| 6,329,951 | B1 | 12/2001 | Wen et al. |
| 6,366,260 | B1 | 4/2002 | Carrender |
| 6,384,727 | B1 | 5/2002 | Diprizio et al. |
| 6,459,588 | B1 | 10/2002 | Morizumi et al. |
| 6,466,131 | B1 | 10/2002 | Tuttle et al. |
| 6,480,110 | B2 | 11/2002 | Lee et al. |
| 6,486,780 | B1 | 11/2002 | Garber et al. |
| 6,501,435 | B1 | 12/2002 | King et al. |
| 6,522,308 | B1 | 2/2003 | Mathieu |
| 6,630,910 | B2 | 10/2003 | Forster et al. |
| 6,657,592 | B2 | 12/2003 | Dening et al. |
| 6,727,855 | B1 | 4/2004 | Nalbandian |
| 6,853,345 | B2 | 2/2005 | King et al. |
| 6,862,004 | B2 | 3/2005 | Alexopoulos et al. |
| 6,903,656 | B1 * | 6/2005 | Lee ............... 340/572.1 |
| 6,950,071 | B2 | 9/2005 | Wen et al. |
| 6,956,472 | B1 | 10/2005 | Walcott, Jr. et al. |
| 7,123,151 | B2 | 10/2006 | Garber et al. |
| 7,151,497 | B2 | 12/2006 | Crystal |
| 7,164,380 | B2 * | 1/2007 | Saito ............... 342/42 |
| 7,221,269 | B2 * | 5/2007 | Onderko et al. ......... 340/539.13 |
| 7,277,017 | B2 | 10/2007 | Baba et al. |
| 7,319,398 | B2 * | 1/2008 | Marino ............... 340/572.7 |
| 7,336,243 | B2 | 2/2008 | Jo et al. |
| 7,443,300 | B2 | 10/2008 | Tessier |
| 7,486,192 | B2 | 2/2009 | Yamagajo |
| 7,525,487 | B2 * | 4/2009 | Burnside et al. ....... 343/700 MS |
| 7,619,529 | B2 * | 11/2009 | Goff et al. ............... 340/572.4 |
| 7,619,530 | B2 | 11/2009 | Kawamata et al. |
| 7,648,065 | B2 * | 1/2010 | Marino ............... 235/383 |
| 7,659,863 | B2 | 2/2010 | Kai et al. |
| 2002/0003496 | A1 | 1/2002 | Brady et al. |
| 2003/0091789 | A1 | 5/2003 | Koskenmaki et al. |
| 2004/0056823 | A1 | 3/2004 | Zuk et al. |
| 2004/0217865 | A1 | 11/2004 | Turner |
| 2005/0024287 | A1 | 2/2005 | Jo et al. |
| 2005/0197074 | A1 | 9/2005 | Cullen et al. |
| 2005/0212707 | A1 | 9/2005 | Egbert et al. |
| 2006/0043199 | A1 | 3/2006 | Baba et al. |
| 2006/0044192 | A1 | 3/2006 | Egbert |
| 2006/0139172 | A1 | 6/2006 | Waldner et al. |
| 2006/0145861 | A1 | 7/2006 | Forster |
| 2006/0164247 | A1 * | 7/2006 | Overhultz et al. ......... 340/572.1 |
| 2006/0208955 | A1 | 9/2006 | Kai et al. |
| 2006/0214801 | A1 | 9/2006 | Murofushi et al. |
| 2006/0238307 | A1 * | 10/2006 | Bauer et al. ............... 340/10.1 |
| 2006/0244604 | A1 | 11/2006 | Sakama et al. |
| 2006/0258327 | A1 | 11/2006 | Lee et al. |
| 2007/0046475 | A1 | 3/2007 | Carrender |
| 2007/0075911 | A1 * | 4/2007 | Yaginuma et al. ............ 343/853 |
| 2007/0099566 | A1 | 5/2007 | Borisov |
| 2007/0176839 | A1 | 8/2007 | Kai et al. |
| 2007/0200782 | A1 | 8/2007 | Hayama et al. |
| 2007/0262903 | A1 * | 11/2007 | Yamada et al. ........ 343/700 MS |
| 2009/0237319 | A1 | 9/2009 | Fukushima et al. |

FOREIGN PATENT DOCUMENTS

| | | |
|---|---|---|
| EP | 0 274 592 A1 | 7/1988 |
| EP | 0 969 547 A2 | 1/2000 |
| EP | 1 026 779 A2 | 8/2000 |
| EP | 1710734 | 10/2006 |
| EP | 1732166 | 12/2006 |
| EP | 1739597 A2 | 1/2007 |
| EP | 1855352 | 11/2007 |
| GB | 2260065 A | 3/1993 |
| GB | 2431053 | 4/2007 |
| JP | 52-052549 | 4/1977 |
| JP | 03-135697 | 6/1991 |
| JP | 2001-225921 | 8/2001 |
| JP | 2002-060021 | 2/2002 |
| JP | 2006235946 A | 9/2006 |
| JP | 2007-070112 | 3/2007 |
| JP | 2007-104413 | 4/2007 |
| WO | WO 99/65002 | 12/1999 |
| WO | WO 00/10122 | 2/2000 |
| WO | WO 00/21030 | 4/2000 |
| WO | WO 00/26993 | 5/2000 |
| WO | WO 00/59067 | 10/2000 |
| WO | WO 01/67384 A1 | 9/2001 |
| WO | WO 03/044892 | 5/2003 |
| WO | WO 2005/022690 A1 | 3/2005 |
| WO | WO 2006/021914 A1 | 3/2006 |
| WO | 2006/050412 | 5/2006 |

OTHER PUBLICATIONS

Multek Flexible Circuits, Inc., Flexible Circuit Design Guidelines, Document DG 01 Rev. C, 9 pages, Jan. 2005.

Technical Information Sheet: LOCTITE®, Product 3447, Henkel Loctite Corporation, Jun. 2003.

Product Literature: What is STYROFOAM?, The Dow Chemical Company, 2 pages, website: http://building.dow.com/styrofoam/what.htm (printed Mar. 26, 2008).

Shortley et al., "Elements of Physics", Prentice-Hall, Inc., Englewood Cliffs, NJ, 1971, pp. 690-693.

Horowitz et al., "The Art of Electronics", Cambridge University Press, Cambridge, England, 1980, pp. 29, 565-568.

Morrow et al., "Rolled Edge Ultra-wideband Dipole Antenna for GPR Application", IEEE Antennas and Propagation Society International Symposium, 2002 Digest, Jun. 16-21, 2002, New York, NY, vol. 1 of 4, Jun. 16, 2002, pp. 484-487.

C.C. Chiau, "A Miniature Dielectric-Loaded Folded Half-Loop Antenna and Ground Plane Effects", IEEE Antennas and Wireless Propagation Letters, vol. 4, 2005, pp. 459-462.

Product Literature: Avery Dennison, Avery Dennison, AD-220 RFID Dry Inlay and Labels, 7 pages, http://www.racoindustries.com/avad220.htm, printed May 27, 2008.

Kleist et al., RFID Labeling, "Smart Labeling Concepts & Applications for the Consumer Packaged Goods Supply Chain", Printronix, Inc., 211 pp., ISBN-0-9760086-0-2 (2004).

U.S. Appl. No. 11/838,356, filed Aug. 14, 2007, "RFID Tag Including a Three-Dimensional Antenna".

U.S. Appl. No. 11/904,625, filed Sep. 27, 2007, "Extended RFID Tag".

International Search Report for International Application No. PCT/US2008/077160, Apr. 14, 2009.

Product Literature: Alien Technology, "Class 1 Gen 1 and Gen 2 Tagging Solutions", Alien Squiggle® Family of EPC RFID Tags, 2005, 2 pages.

Product Literature: Impinj®, "UHF Gen 2 RFID Tag Silicon", Aug. 2006, 1 page.

Product Literature: SAMSys, Technologies, Inc., "MP9320, v2.8 EPC UHF RFID Reader", 2005, 2 pages.

* cited by examiner

SIGNAL LINE STRUCTURE FOR A RADIO-FREQUENCY IDENTIFICATION SYSTEM

TECHNICAL FIELD

The invention relates to the use of radio frequency identification systems for document and file management and, more specifically to antennas in a radio frequency identification systems.

BACKGROUND

Radio-Frequency Identification (RFID) technology has become widely used in virtually every industry, including transportation, manufacturing, waste management, postal tracking, airline baggage reconciliation, and highway toll management. A typical RFID system includes RFID tags, an RFID reader, and a computing device. The RFID reader includes a transmitter that may provide energy or information to the tags, and a receiver to receive identity and other information from the tags.

The transmitter outputs RF signals through the antenna to create an electromagnetic field that enables the tags to return an RF signal carrying the information. The transmitter makes use of an amplifier to drive the antenna with a modulated output signal. A conventional tag may be an "active" tag that includes an internal power source, or a "passive" tag that is energized by the field. Once energized, the tags communicate using a pre-defined protocol, allowing the RFID reader to receive information from one or more tags. The computing device serves as an information management system by receiving the information from the RFID reader, and performing some action, such as updating a database or sounding an alarm. In addition, the computing device serves as a mechanism for programming data into the tags via the transmitter.

SUMMARY

In general, the invention relates to a signal line structure that provides a wave guide for producing an electromagnetic field for radio-frequency identification. The signal line may be, for example, embedded within a "smart storage area" of an RFID system. As described in detail, the smart storage areas may be equipped with at least one signal line to produce electromagnetic fields, and RFID interrogation capability to aid in tracking and locating documents or files within the system. The RFID interrogation capability of smart storage areas may read RFID tags associated with the items stored in the respective storage areas. Examples of smart storage areas include a shelving unit, a cabinet, a vertical file separator, a smart cart, a desktop reader, or a similar location.

Embodiments of the signal line structure may be used in many RFID applications, such as the smart storage areas. In order to provide reliable communications, it may be desirable to create as large an electromagnetic field as possible within an "interrogation region." The embodiments of the signal line structure described herein substantially extend the near field (i.e., the fringing field, bound field or non-radiating field) to distances that exceed those of conventional structures, e.g., 15 millimeters or less. Moreover, the signal line structures described herein produce magnetic fields that have magnitudes that meet or exceed a minimum interrogation threshold needed to energize tags for a substantial portion of the interrogation region.

In one embodiment, the invention is directed to a radio frequency identification (RFID)-enabled shelf comprising, a substrate providing a shelf for items having RFID tags, a signal line structure comprising, a signal line affixed to a first side of the substrate to generate a radio frequency (RF) electromagnetic field for interrogating one or more of the RFID tags, an electrical conductor providing an electrical ground plane on a second side of the substrate opposite the signal line, and an electrical load coupling the signal line and ground plane.

In another embodiment, the invention is directed to a radio frequency identification (RFID) system, comprising a plurality of RFID-enabled shelves for storing items having RFID tags, each of the shelves having a substrate and signal line structure that includes a signal line on a first side of the substrate to generate a radio frequency (RF) electromagnetic field for interrogating one or more of the RFID tags and an electrical conductor providing an electrical ground plane on a second side of the substrate opposite the signal line, and an electrical load coupling the signal line of a last one of the shelves to the ground plane of the last shelf, wherein each of the shelves is physically connected to at least one adjacent shelf, wherein the signal line of each of the shelves is coupled to a signal line of at least one adjacent shelf, and wherein the ground plane of each of the shelves is coupled to a ground plane of at least one adjacent shelf.

In yet another embodiment, the invention is directed to a radio frequency identification (RFID) system comprising an RFID reader, a radio frequency identification (RFID)-enabled shelf electrically coupled to the RFID reader to generate a radio frequency (RF) electromagnetic field when powered by the RFID reader, the RFID-enabled shelf comprising, a substrate providing a shelf for items having RFID tags, a signal line structure comprising, a signal line affixed to a first side of the substrate to generate a radio frequency (RF) electromagnetic field for interrogating one or more of the RFID tags, and electrical conductor providing an electrical ground plane on a second side of the substrate opposite the signal line, and an electrical load coupling the signal line and ground plane.

In still yet another embodiment, the invention is directed to a method for detecting the presence of a particular item of interest within a radio frequency (RFID) system comprising, outputting a first output signal from an RFID reader to a signal line structure of an RFID-enabled shelf to generate a radio frequency (RF) electromagnetic field for interrogating one or more of the RFID tags associated with items located on the shelf, the signal line structure comprising a first signal line affixed to a first side of the shelf, an electrical conductor providing an electrical ground plane on a second side of the substrate opposite the signal line and an electrical load coupling the signal line and ground plane, receiving a response RF signal from at least one of the RFID tags via the signal line structure, and determining, based on the response RF signal, whether an item of interest is stored on the shelf.

In still yet another embodiment, the invention is directed to a method for identifying the lateral position on a shelf of a particular item of interest within a radio frequency identification (RFID) system comprising, powering each of a plurality of signal lines of a signal line structure with at least one reader, wherein each of the plurality of signal lines are different in length, extending longitudinally along the length of the shelf, determining which of the plurality of signal lines backscatters a radio frequency (RF) signal from an RFID tag associated with a particular item of interest, identifying a position of a particular item of interest based on an end location of a signal line of the plurality of signal lines having a shortest length that backscattered the RF signal from the RFID tag associated with the particular item of interest, and an end location of a signal line of the plurality of signal lines having a next shortest length from the signal line having the shortest length that backscattered the RF signal from the RFID tag associated with the particular item of interest.

In some embodiments, the signal line structure of the invention may create a bounded electromagnetic region in an area just above the structure. By adjusting the characteristics of the signal line structure, the interrogation area may be changed. In this manner, problems with multi-path effects, seen in traditional RFID systems, such as crosstalk between the tags and antennas on different shelves may be reduced or eliminated. Therefore only tags within the interrogation area may be read. Additionally, a signal line structure may require considerably less power than a traditional antenna approach to activate densely packed RFID tags.

In some other embodiments, a signal line structure may provide a higher performing detection shelf that may be applied generally to track items in an RFID system. The size of the item, size of the shelf, available space for the tag may be varied. The arrangement of the items on the shelf may be varied. And a user of the RFID system may not have to place the item on the shelf in any needed orientation or relative position. Also, in accordance with the invention, a signal line structure may provide the location of a particular item of interest within a shelf.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
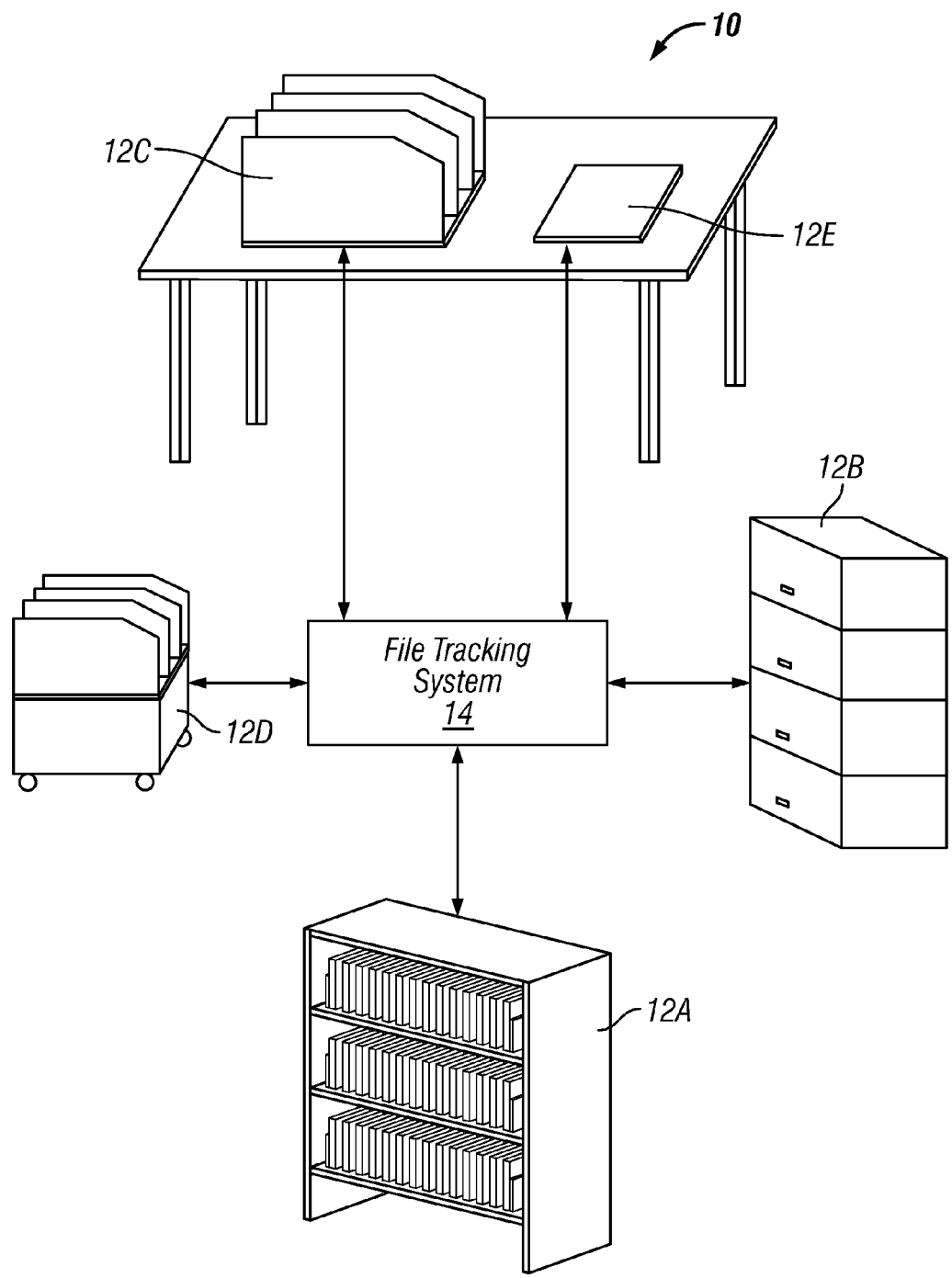
FIG. 1 is a block diagram illustrating a radio frequency identification (RFID) system for document and file management.

FIG. 1 is a block diagram illustrating an example radio frequency identification (RFID) system 10 for document and file management. Despite some interest in converting offices to paperless environments in which paper documents are entirely replaced by electronic versions of those documents, a number of industries continue to rely heavily on paper documents. Examples include law offices, government agencies, and facilities for storing business, criminal, and medical records. These files may be positioned in a number of "smart storage areas" 12, e.g., on an open shelf 12A, a cabinet 12B, a vertical file separator 12C, a smart cart 12D, a desktop reader 12E, or a similar location, as shown in FIG. 1.

In this manner, smart storage areas 12 may be provided at multiple locations within an organization, as opposed to in a single file room. For example, a smart storage area 12 may be associated with a particular location, e.g., a docketing shelf, and thus may be referred to or considered to be "dedicated" shelves. As also described below, smart storage areas 12 could be located near individual offices or other areas in, for example, a hospital or clinic, a law firm, an accounting firm, a brokerage house, or a bank, to enable files to be tracked not only when they are located in a central file room, but also when they are located at distributed locations.

The term "smart storage area" is used herein generally to refer to a storage area that is equipped with RFID interrogation capability to aid in tracking and locating items positioned within the storage areas. In particular, the RFID interrogation capability of smart storage areas 12 may read RFID tags associated with the items stored in the respective storage areas. In other words, RFID tags may be associated with or applied to items of interest. The tag may even be embedded within the item or the packaging of the item so that the tag is at least substantially imperceptible, which can help to prevent detection and tampering. Thus it would be possible to "source-mark" items with an RFID tag, such as inserting an RFID tag into or applying an RFID tag to an item during its manufacture, as with a file folder, document, book, or the like.

RFID tags or labels are made by various manufacturers, including Texas Instruments of Dallas Tex., under the designation "Tag-it." An RFID tag typically includes an integrated circuit with a certain amount of memory, a portion of which may be used to write certain information to the tag, and another portion of which may be used to store additional information to the tag. The integrated circuit is operatively connected to an antenna that receives RF energy from a source and also backscatters RF energy in a manner well known in the art. It is this backscattered RF energy that provides a signal that may be received by an interrogator, commonly referred to as a reader, within file tracking system 14 to obtain information about the RFID tag, and the item with which it is associated.

RFID system 10 may operate within an ultra high frequency (UHF) range of the electromagnetic spectrum, such as between 900 MHz and 3.0 GHz, which is often used for Industrial, Scientific and Medical (ISM) applications. However, other frequencies may be used for RFID applications, and the invention is not so limited. As another example, RFID systems may operate at lower frequency of 13.56 MHz, with an allowable frequency variance of +/−7 kHz.

The RFID interrogators or reader pads of smart storage areas 12 communicate information to file tracking system 14 that provides a central data store, e.g., within one or more databases of a relational database management system (RDBMS) for aggregation of the position information. Example information includes position information for the particular items or information read from the RFID chip. For example, RFID system 10 may track medical files and information may include patent identifiers, file identifiers, status, physician information, case information and the like. File tracking system 14 may be networked or otherwise coupled to one or more computers so that individuals at various locations can access data relative to those items.

Collection and aggregation of the information may be useful for a number of purposes. For example, a user may request the location of a particular item or group of items, such as a file or a group of books. File tracking system 14 may retrieve the file location information from the data store, and report to the user the last location at which the items were located within one of the storage areas. Optionally, the system can re-poll or otherwise re-acquire the current location of the item to verify that the item is in the location indicated in the database.

As another example, file-tracking system 14 may notify a user when an item is placed at a certain location and is ready for use. For example, an attorney may be notified that a file is ready for review and recently placed at his or her desk. Naturally, file tracking system 14 could be applied to legal files stored in court rooms or court houses, and used by court personnel such as judges, clerks, and the like. Similarly, if patient files are located in a designated area, a medical professional may be notified (perhaps through a cellular telephone or a pager, or by e-mail) that the file (and perhaps the person to whom the file relates) is ready for review.

The fact that the file was located at a certain location awaiting further processing can be recorded by file tracking system 14 as part of a history of the location of that item. Note that a certain file located on a certain shelf or other storage location, on which a certain person is expected to work, is different than a storage room containing a large group of files (perhaps) awaiting work by any person within a group or organization. Stated differently, the certain shelf having a certain file for a certain person is specific to that person, whereas a general file room housing all files for all members of a group is not specific to anyone.

In addition, the information collected by RFID system 10 may be useful in tracking, for example, cycle time in processes, efficiency of one or more people who work with the files, and efficiency of the process. This information can also provide a type of location archive if the information is maintained within the software system.

Some of the smart storage areas 12 of system 10 may be equipped with one or more signal line structures that provide propagating wave guides for interrogating the files, e.g., to aid in determining which files are located at each of the storage areas 12. For example, one or more signal line structures are positioned within shelving units of open shelf 12A to create electromagnetic fields for communicating with the RFID tags associated with the files. Similarly, signal line structures may be located within cabinet 12B, vertical file separator 12C, smart cart 12D, desktop reader 12E, and the like. Existing shelves can be retrofitted to include the signal line structures, or the signal line structures may be built into a shelf and purchased as a unit with the shelf. As another example, the signal line structure may be built into a frame or housing (e.g., back panel) of a smart storage area 12.

Each of smart storage areas 12 may include a signal line structure control system to energize the signal line in the signal line structure for interrogating, or polling, the RFID tags. If polling is performed continuously, a controller within the signal line structure control system may include a circuit for multiplexing signals through multiple signal lines in a signal line structure sequentially. The signal line structure control system may cause the signal lines to interrogate portions of the smart storage area 12 in a predetermined order. The signal line structure control system may include one or more control nodes, i.e., subcontrollers, that operate to control a subset of the signal lines. The number, location, and other characteristics of the signal line associated with a given control node may be determined by the user. For example, if it is desired to poll the shelves quickly, more control nodes may be added to the system. Another approach is for the user to configure or customize the signal line structure control system so that control nodes or portions of the smart storage area 12 are polled in a sequence specified by the user. For example, if one portion of a smart storage area 12 is unavailable for use at certain times, then the RFID tags in that area need not be interrogated during those times.

As described in detail herein, the signal line or signal lines, in a signal line structure, used within each of smart storage areas 12 may be designed to develop electromagnetic fields of at least certain strengths within "interrogation regions" within the storage areas 12. This may be advantageous for one or more reasons, including improving the accuracy of file detection throughout the interrogation regions of a given smart storage area 12. The magnetic field created by the signal line may be used to power the tags associated with the items within the smart storage area 12, and the amount of energy induced in each tag is generally proportional to the strength of the electromagnetic field surrounding the signal line. Advantageously, the signal line structure may be utilized to produce a field having a magnitude over an interrogation period that exceeds a threshold magnitude for energizing an RFID tag. In other words, the signal line structure may be controlled to produce an electromagnetic field having a magnitude that meets or exceed an interrogation threshold (e.g., 100-115 dBuA/m) sufficient for communication with extended RFID tags at distances of up to several inches from the signal line structure. Consequently, the techniques described herein can improve the likelihood that all or substantially all of the tags associated with the items positioned within the storage areas 12 can be energized, and the items can be successfully detected.

Figure 2:
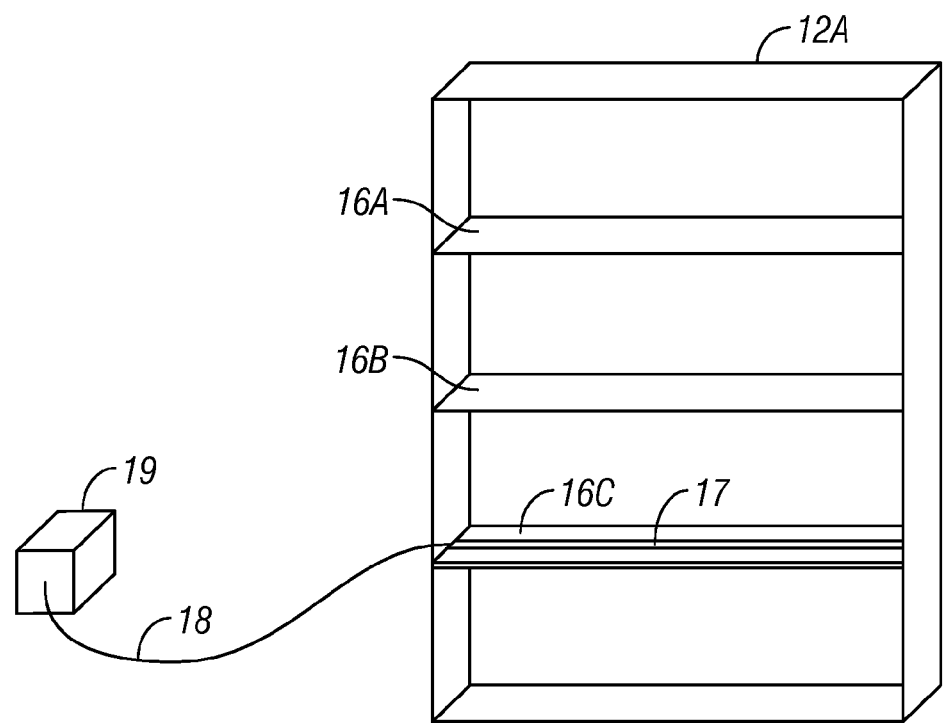
FIG. 2 is a block diagram illustrating a storage area including a shelf containing a signal line.

FIG. 2 is a block diagram illustrating an exemplary embodiment of smart storage area 12A of FIG. 1. In this example embodiment, smart storage area 12A includes multiple shelves 16A-16C (collectively, "shelves 16"). Of course, in other embodiments, smart storage area 12A may contain more or fewer than three shelves. In the example of FIG. 2, smart storage area 12A contains shelf 16C having a signal line 17 of a signal line structure. Signal line 17 may be electrically coupled to an RFID reader 19 through a cable 18. Cable 18 may be any type of cable with the ability to transmit signals to and from RFID reader 19, for example a standard RG58 coax cable. One example of RFID reader 19 is Sirit Infinity 510 reader sold by Sirit, Inc. of Toronto, Canada. Books, folders, boxes, or other items containing RFID tags may be placed upon shelf 16C. RFID reader 19 powers signal line 17 through cable 18 by outputting a signal. When powered, signal line 17 generates an electromagnetic field, as described in further detail below. The electromagnetic field powers RFID tags located on the shelf 16C. The powered RFID tags may backscatter RF signals including information which is received by signal line 17 and electrically transmitted to RFID reader 19 through cable 18. For example, an RFID tag affixed to a folder positioned on shelf 16C may backscatter RF signals to RFID reader 19 acknowledging that the RFID tag (and correspondingly, the folder) is located on the shelf.

In other embodiments, each of shelves 16 may contain a signal line 17 of a signal line structure. In such embodiments, each shelf 16 may have a separate associated RFID reader 19. In another embodiment, multiple shelves 16 within smart storage area 12A may be cabled together to connect to a single reader 19. In such an embodiment, reader 19 may receive an acknowledgement indicating that a folder containing an RFID tag is located on a particular one of shelves 16 in smart storage area 12A.

In yet another embodiment, multiple smart storage areas 12 may be connected to each other. For example, cabling may be used to interconnect shelf 16C in smart storage area 12A with a shelf in smart storage area 12B, where the shelf in storage area 12B is substantially similar to shelf 16C. In such embodiments, a single reader 19 may interrogate items positioned within storage areas 12A and 12B to read information from the tags associated with the items and determine the location of a particular folder within smart storage area 12A or smart storage area 12B. Although described for purposes of example with respect to smart storage area 12A and 12B, any of smart storage areas 12 may include one or more signal lines 17 of a signal line structure that are used to interrogate items within the storage areas 12 as described herein. Additionally, embodiments using one or more RFID readers 19 connected to one or more shelves 16 have been described.

Figure 3:
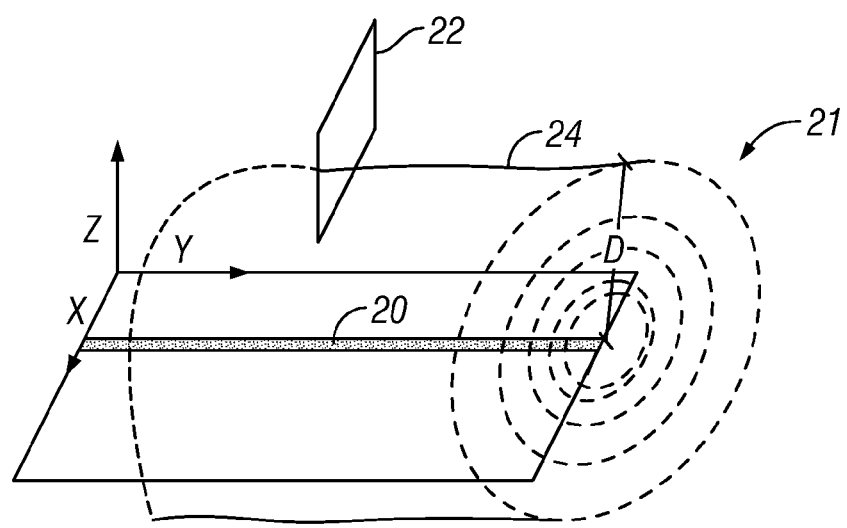
FIG. 3 is a perspective diagram illustrating an example orientation for an antenna of an RFID reader relative to a tag associated with a document or file.

FIG. 3 is a perspective diagram illustrating an example orientation for a signal line 20 relative to an RFID tag 22 associated with an item (not shown) located within one of smart storage areas 12. In many RFID applications, such as the smart storage areas 12 of RFID system 10, it is often advantageous to create a large electromagnetic field 21. In this case, electromagnetic field extends in a half cylindrical shape from signal line 20, as indicated by the dotted lines, to form an interrogation region 24. In particular, the field 21 has a magnitude that meets or exceeds a minimum interrogation threshold needed to energize the tag 22 throughout a substantial portion of interrogation region 24 to provide reliable communications throughout the interrogation region. For example, signal line 20 may generate an electromagnetic field capable of communicating with RFID tag 22 at a distance (D) by extending a near-field component of the electromagnetic field substantially beyond distances realized by conventional structures (e.g., approximately 15 mm 0.59 inches or less from signal line 20). Each of smart storage areas 12 may utilize one or more signal lines 20 of a signal line structure capable of producing an electromagnetic field that meets or exceeds an interrogation threshold for energizing tags throughout the smart storage area.

In all the examples and exemplary embodiments described herein, RFID tags 22 associated with particular items may be similar, and the items themselves may be similar. For example, an RFID tag 22 associated with a particular item may be of a similar type to all other RFID tags 22 associated with items placed on signal line 20. An example tag 22 is described in co-pending application Ser. No. 11/904,625, filed on Sep. 27, 2007, entitled EXTENDED RFID TAG, the entire contents of which is incorporated by reference herein.

Figure 4A:
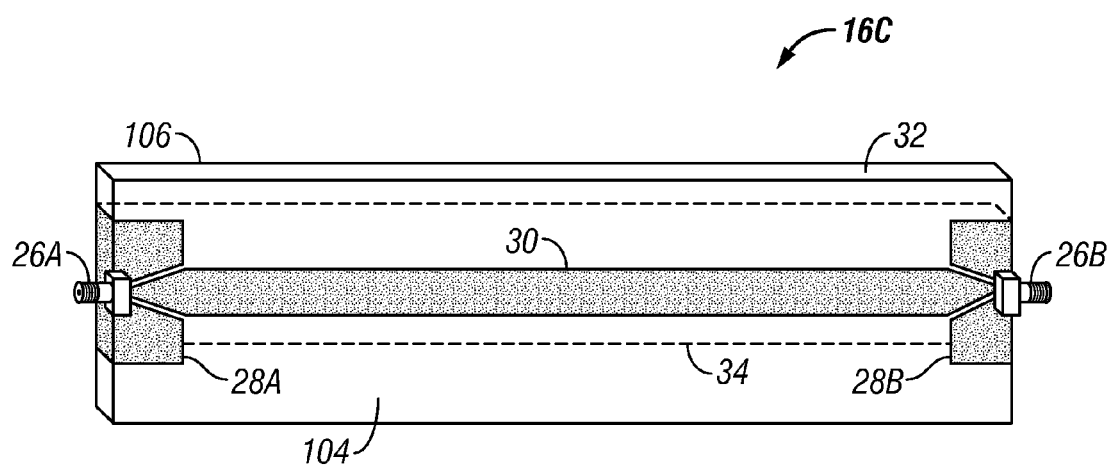
FIG. 4A is a schematic diagram illustrating a perspective view of an exemplary embodiment of a shelf containing a signal line.

FIG. 4A is a schematic of a perspective view of an exemplary embodiment of shelf 16C of FIG. 1 in further detail. Shelf 16C comprises substrate 32, which may be made from a polystyrene sheet, or other type of substrate material. Signal line 30 may be affixed onto a top surface 104 of shelf 16C, and ground plane 34 (represented by dashed lines) may be affixed onto a bottom surface 106 of shelf 16C. Other techniques for placing signal line 30 and ground plane 34 may be used. Signal line 30 may be coupled to connectors 26A and 26B at each end. In the example of FIG. 4, connectors 26A and 26B are illustrated as SubMiniature version A (SMA) connectors, but other types of connectors may also be used. Ground plane portions 28A and 28B are portions of ground plane 34 that have been wrapped around to extend to the top surface 104 of shelf 16C. As one example, signal line 30 and ground plane 34 may be composed of copper tape. In one example embodiment, the width of ground plane 34 may be at least twice the width of signal line 30. In another example embodiment, the width of ground plane 34 may be at least three times the width of signal line 30. In another example embodiment, the width of ground plane 34 may be at least four times the width of signal line 30. As illustrated below, the width of the ground plane 34 relative to the width of signal line 30 impacts the read range of the signal line structure of shelf 16C.

RFID reader 19 (FIG. 2) is coupled to connector 26A through cable 18. To avoid impedance mismatches between RFID reader 19 and connector 26A, a matching structure is used to efficiently couple power from RFID reader 19 to signal line 30 and reduce reflections at connector 26A. In embodiments where only one shelf 16C is being used, a load may be connected to connector 26B for proper termination. As one example, a 2 Watt, 50 ohm load may be used.

Figure 4B:
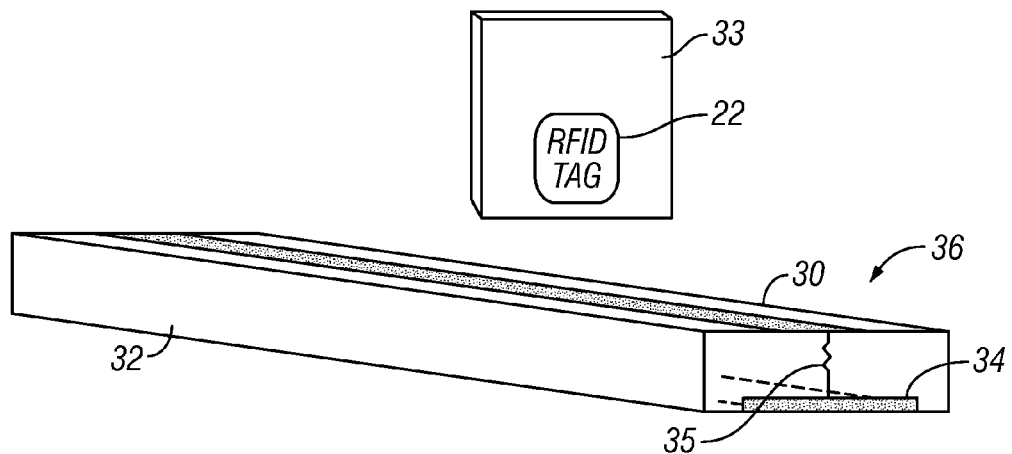
FIG. 4B is a schematic diagram illustrating a perspective view of an exemplary signal line structure.

FIG. 4B is a schematic of a perspective view of a shelf having an exemplary signal line structure 36. Signal line structure 36 includes at least one signal line 30, ground plane 34, and in some embodiments a load 35. Signal line 30 and ground plane 34 may be separated by substrate 32. In other embodiments, signal line structure 36 may include a plurality of signal lines substantially similar to signal line 30. A folder 33 containing an RFID tag 22 may be placed upon signal line 30. Embodiments described herein will refer to a signal line or signal lines, but one skilled in the art will realize that the signal line or signal lines are part of a signal line structure.

In situations where a relatively large number items containing RFID tags are placed on shelf 16C, it may be useful to determine the portion of shelf 16C a particular item of interest is located e.g., to the left, right, or middle of shelf 16C. At least two options for providing a lateral shelf location (i.e. a side-to-side position or longitudinal position) along the length of the shelf utilizing signal line structures are described for purposes of example.

The first option dynamically changes electrical loading at various known points across signal line 30. RFID reader 19 may generate control logic to drive for example switches, or the like, to select termination loads placed at various locations across signal line 30. Changing loads at various known points across signal line 30 effectively changes the electrical length of signal line 30, because the load may terminate the signal from RFID reader 19. In such an embodiment, electrical loads coupled through a switch, or the like, may be placed at known locations on signal line 30. RFID reader 19 may power signal line 30, but due to which load is selected by RFID reader 19, the electrical length of signal line 30 may extend along signal line 30 only from connector 26A to the load. Based on the backscattered RF signals received from RFID tags 22 placed on items on shelf 16C, RFID reader 19 may determine whether a response is received from a particular item of interest. If so, RFID reader 19 determines that the item of interest is located between connector 26A and the position of the load. If the particular item of interest is not located before the load, RFID reader 19 may select a second load on a different location on signal line 30, and RFID reader 19 may check again to see if the particular item of interest is located before the load. This process may repeat until the particular item of interest is found. In this manner, the relative location of a particular item of interest may be determined to be between the current position of the selected load and the location of the previously selected load. This process may be especially useful for a very long shelf 16C or a shelf 16C with a large number of items containing RFID tags. Knowing the relative location of a particular item of interest may allow the item to be located more quickly on a shelf. In another embodiment, the load may be placed at a known location and if the particular item of interest is located before the load, RFID reader 19 may select another load on a different position on signal line 30. RFID reader 19 may check again to see if the particular item of interest is located before the load. This process may repeat until the particular item of interest is no longer before the load. In this manner, the relative location of a particular item of interest may be determined to be between the current position of the selected load and the location of the previously selected load.

The second option for providing a lateral shelf location capability is to construct signal line 30 from a series of different dielectric materials in substrate 32 of know widths, thereby defining known positional regions along substrate 32 of shelf 16C. For example, dielectric materials having lower dielectric constants utilized closer to RFID reader 19. The use of different dielectric materials along signal line 30 effectively causes the signal line to produces an electromagnetic field having an envelop that decays from right to left in a direction away from reader 19. That is, the portions of signal line 30 closer to reader 19 having a higher dielectric constant will produce a portion of the electromagnetic field with a lower magnitude than portions of signal line 30 formed from a material having a higher dielectric constant. Power from RFID reader 19 may be sequentially increased so that the magnitude of the electromagnetic field to in each positional region along signal line 30 sequentially passes the interrogation threshold. This process can be continued until an RFID tag on a particular device of interest is detected, i.e., is energized and backscatters RF signals to RFID reader 19.

For example, assume a particular item of interest is located on shelf 16C at a position near the end of signal line 30, close to connector 26B. Further, assume that different dielectric materials are present within substrate 32 at sections corresponding to a first portion, a second portion, and a last portion of signal line 30. Initially, the power from RFID reader 19 may be low, such that only the first portion of signal line 30 is able to create an electromagnetic field having an intensity greater than a threshold intensity to achieve RF communications with tags located in that portion. Since the particular device of interest is located in the last portion of signal line 30, any backscattered RF signals received by RFID reader 19 in response to the powering will not contain information relating to the particular item of interest. The power of RFID reader 19 may then be increased such that the resulting electromagnetic field of at least sufficient intensity for RF communications extends up to and includes the second portion of signal line 30. Once again, the backscattered RF signals received by RFID reader 19 in response to the powering will not contain information relating to the particular item of interest. Finally, the power of RFID reader 19 may then be increased again such that the resulting electromagnetic field of sufficient intensity extends to the end of signal line 30. In this situation, the backscattered RF signals received by RFID reader 19 in response to the powering will include RF signals from the RFID tag associated with the particular item of interest. Therefore, the relative location of the particular item of interest will be known to be in the last portion of shelf 16C.

In other embodiments, the power from RFID reader 19 may be ramped down, i.e., lowered. In such embodiment, RFID reader 19 first determines whether a response from a particular item of interest is received and then sequentially ramps power down until the particular item of interest is no longer detected. Moreover, these and other techniques may be combined to increase the accuracy of the position determination. The dividing of signal line 30 into three portions is merely illustrative; signal line 30 may be divided down into more or fewer portions as may be necessary.

Items 33 containing RFID tags 22, such as folders, may generally be placed on smart storage areas (e.g., shelf 16C of FIG. 2) in a lateral configuration. However, in some cases items having RFID tags 22, such as files or boxes, may be placed back-to-front. If items containing RFID tag 22 are placed back-to-front on shelf 16C, it may be possible that a single signal line 17 (FIG. 2) cannot generate a strong enough electromagnetic field to power the RFID tags 22 on all of the items. For example, RFID tags 22 of items placed at the extreme front or back of shelf 40 may be located at a distance from a single centered signal line 17 that is greater than the range of the electromagnetic field generated by the signal line 17. This may occur due to the placement of RFID tag 22 on the items, or if shelf 16C is extremely wide.

Figure 5:
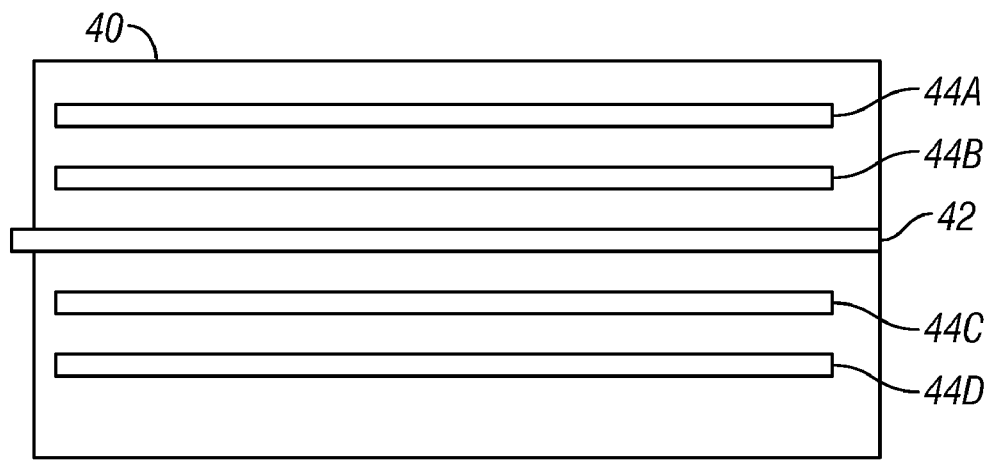
FIG. 5 is a schematic diagram illustrating an exemplary embodiment of a shelf containing a plurality of signal lines laid horizontally where the plurality of signal lines are parasitically coupled to a signal line.

FIG. 5 is a schematic diagram of a top-view illustrating an exemplary embodiment of shelf 40. Shelf 40 is designed to provide increased depth of read range within shelf 40 (i.e., from the front of the shelf to the back) to address the problem described above. As shown in FIG. 5, shelf 40 contains a plurality of parasitic signal lines 44A-44D (collectively, signal lines 44), and at least one powered signal line 42 connected to at least one RFID reader 19. Though not shown, powered signal line 42 may be terminated by a load connected to ground. The use of parasitic signal lines 44 may, in effect, provide an increased depth of the range of electromagnetic field generated by power signal line 42 without requiring any additional readers and/or ports.

Power signal line 42 may be powered by RFID reader 19. The electromagnetic field generated by powered signal line 42 electromagnetically couple with one or more of parasitic signal lines 44 to excite the parasitic signal lines. In other words, the electromagnetic field generated by power signal line 42 may induce a parasitic current in each of parasitic signal lines 44, which in turn creates a local electromagnetic field around each of the parasitic signal lines. In this manner, an RFID tag 22 associated with an item may be powered by any one or a combination of parasitic signal lines 44 and/or powered signal line 42, and the backscattered RF signal of the particular item of interest may be recognized by RFID reader 19. For example, an item having an RFID tag 22 that is placed at the back of shelf 40 may be powered by an electromagnetic field generated by parasitic signal line 44D, while an item having an RFID tag 22 that is placed at the front of shelf 40 may be powered by an electromagnetic field generated by parasitic signal line 44A. More or fewer parasitic signal lines 44 may be used in various embodiments. The placement of power signal line 42 may also be varied in various embodiments.

Figure 6:
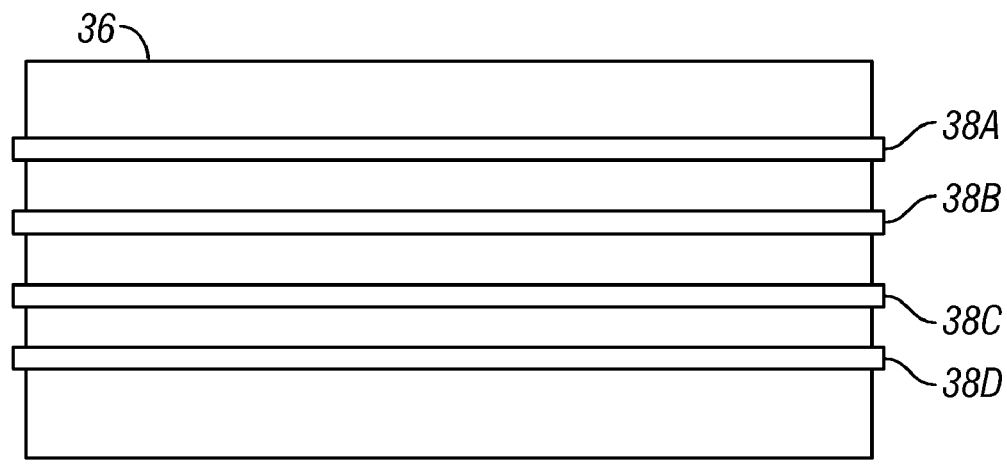
FIG. 6 is a schematic diagram illustrating an exemplary embodiment of a shelf containing a plurality of signal lines laid horizontally where each signal line may be powered by an RFID reader.

FIG. 6 is a schematic diagram of a top-view illustrating another exemplary embodiment of shelf 36. When items having RFID tags 22 are placed on shelf 36 back-to-front, it may be desirable to identify a position of an item with respect to the shelf depth, e.g., whether the item is located near a back, middle, or front portion of shelf 36, in addition to whether the item is located near a left, right, or middle portion of shelf 36. Techniques are described for identifying a location of an item on the shelf with respect to the length and depth of the shelf. While the terms "front," "middle," "back," "right," and "left" are used herein for ease and clarity, the techniques described may be used to determine more precise locations of a particular item of interest.

In this example, shelf 36 contains a plurality of signal lines 38A-38D (collectively referred to as signal lines 38) extending longitudinally along the length of shelf 36. In various embodiments, more or fewer signal lines 38 may be used. Though not shown, signal lines 38 may be terminated by a load connected to ground. Items containing RFID tags 22 may be placed back-to-front on shelf 36. As shown in FIG. 6, signal lines 38A-38D are substantially equally spaced apart across the width of the shelf and can be selectively energized to determine a depth position (i.e., a depth position also referred to herein as a front-to-back position) of an item placed on the shelf. In the embodiment of FIG. 6, each one of signal lines 38 may be powered sequentially using one or more RFID readers 19. Powering of one of signal lines 38 may cause the remaining signal lines 38 that are not being powered at a given time to parasitically excite the electromagnetic field generated by the powered signal line. However, in some embodiments the non-powered signal lines 38 may be prevented from resonating by techniques well known in the art. For example, the non-powered signal lines 38 may be selectively electrically switched to directly connect to the ground plane.

In embodiments where one or more of signal lines 38 are powered, a particular item of interest containing an RFID tag 22 may backscatter an RF signal through one or more of signal lines 38 to one or more RFID readers 19. The depth location (e.g., front, middle, or back of shelf 36) of a particular item of interest containing an RFID tag 22 can be determined based on which of signal lines 38 have backscattered RF signals to RFID reader 19. For example, assume a particular item of interest is placed in a back-right corner of shelf 36. Signal lines 38 may then be powered sequentially. Signal line 38A may be powered first, while signal lines 38B-38D are prevented from parasitic excitation. The particular item of interest may not backscatter RF signals because RFID tag 22 may be beyond the range of the electromagnetic field generated by signal line 38A. This process may be repeated until an RFID reader 19 connected to signal line 38D powers signal line 38D. When signal line 38D is powered and the remaining signal lines 38 are prevented from resonating, RFID tag 22 may receive power from an electromagnetic field generated by signal line 38D and backscatter RF signals to RFID reader 19 via signal line 38D. If responses are received from a particular item of interest via multiple signal lines 38, then reader 19 may use a signal strength associated with each response to identify the correct depth position for the item. For example, the signal line that backscatters the strongest RF signal may be used to determine the depth location for the item. Alternatively, if responses are received via a set of signal lines 38, then reader 19 may determine the depth position of the item of interest by identifying the signal line that is positioned within the middle of the set (e.g., selecting the middle signal line from three adjacent signal lines by which responses were received). In this manner, the location of the particular item of interest can be determined to be in the back of shelf 36. Additionally, by applying the techniques described above with respect to FIG. 4, the lateral position of the particular item of the particular item of interest can also be determined.

The techniques described above describe powering signal lines 38 in a sequential fashion. However, other techniques may also be used. In one embodiment, each of signal lines 38 may be powered with a different RFID reader 19. The depth location of an item of interest can be determined based on which of the RFID readers 19 receives backscattered RF signals from the RFID tag 22 of the particular item of interest. In another embodiment, a recursive method may be used to power only a first subset of signal lines 38 and then to determine if the particular item of interest has backscattered RF signals. If the particular item of interest has backscattered RF signals, then only sub-subset of the first subset of signal lines 38 may be powered, and the process is repeated until the depth location of the particular item of interest can be determined. If the particular item of interest does not backscatter RF signals when the first subset of signal lines 38 are powered, then a second subset of signal lines 38 are powered to check whether the particular item of interest backscatters RF signals. The process repeats until the depth location of the particular item of interest can be determined. In other embodiments, signal lines 38 may be powered in various other sequences.

Figure 7:
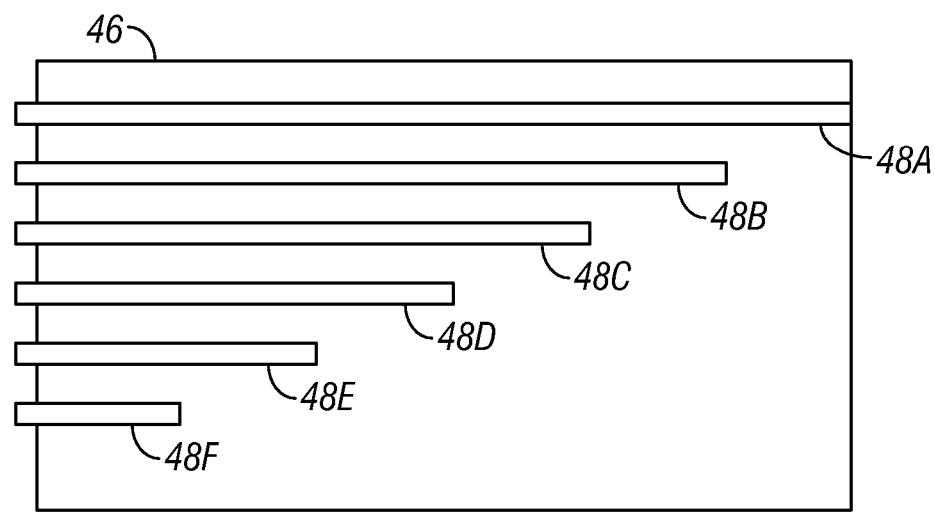
FIG. 7 is a schematic diagram illustrating an exemplary embodiment of a shelf containing a plurality of signal lines laid horizontally with varying lengths.

FIG. 7 is a schematic diagram illustrating a top-view of another exemplary embodiment of a shelf 46. In this example, shelf 46 contains a plurality of signal lines 48A-48F (collectively, signal lines 48) of varying lengths. More or fewer signal lines 48 may be used in various embodiments, and their respective lengths may be varied from the exemplary embodiment shown in FIG. 7. Though not shown, signal lines 48 may be terminated by a load connected to ground. In the embodiment of FIG. 7, shelf 46 may be used to identify the lateral location of a particular item of interest on shelf 46. The embodiment of FIG. 7 may be particularly useful where the items placed on shelf 46 are similar in size. The signal line having the shortest length (signal line 48F) may be powered first by an RFID reader 19, while the remaining signal lines 48 may be prevented from resonating. If a particular RFID tag 22 of an item of interest backscatters RF signals to RFID reader 19, the location of the particular item of interest is known to be located at a lateral position on shelf 46 along the length of signal line 48F. If the particular item of interest does not backscatter RF signals to reader 19, then signal line having the next shortest length (signal line 48E) may be powered by an RFID reader 19, while the remaining signal lines 48 may be stopped from resonating. If the particular item of interest backscatters RF signals to RFID reader 19, then the location of the particular item of interest is known to be at a lateral position on shelf 46 between the end of signal line 48F and the end of signal line 48E. This process may be repeated until the RFID tag 22 associated with the particular item of interest returns an RF signal to RFID reader 19. In this manner, after the particular item of interest is found, the location of the item of interest can be determined as being between the end of the powered signal line, and the previously powered signal line.

In another embodiment, all signal lines 48 may be powered by one or more RFID readers 19. The RFID tag 22 associated with the particular item of interest may backscatter RF signals to RFID reader 19. The lateral position of the particular item of interest along shelf 46 can be determined based on which signal lines 48 transmit the backscattered RF signal to RFID reader 19. Signal lines 48 may be powered in various other sequences.

Figure 8:
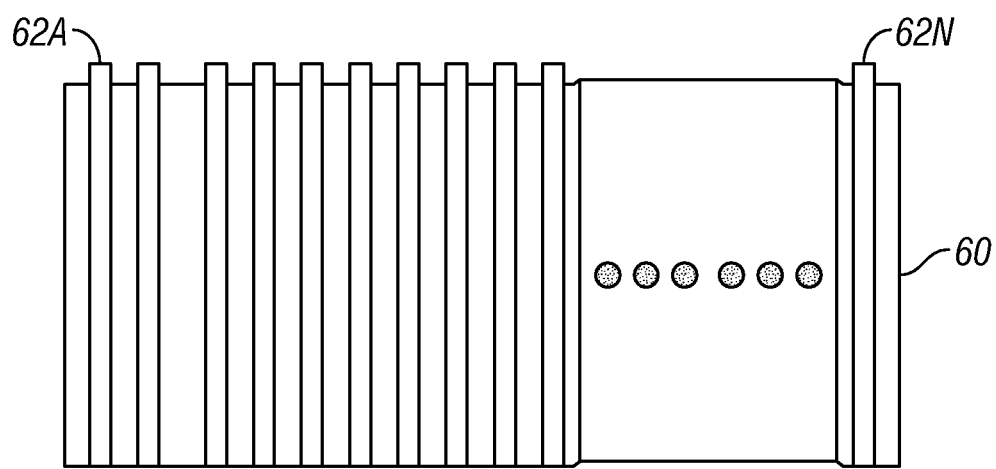
FIG. 8 is a schematic diagram illustrating an exemplary embodiment of a shelf containing a plurality of signal lines laid vertically where each signal line may be powered by an RFID reader.

FIG. 8 is a schematic diagram illustrating a top-view of another exemplary embodiment of a shelf 60. Shelf 60 contains a plurality of signal lines 62A-62N (collectively, signal lines 62) extending across the width of the shelf 60, i.e. from front to back. As shown in FIG. 8, signal lines 62A-62N are substantially equally spaced a lateral distance apart along the length of the shelf and can be selectively energized to determine a longitudinal position (i.e., a lateral position also referred to herein as a side-to-side position) of an item placed on the shelf.

Though not shown, signal lines 62 may be terminated by a load connected to an electrical conductor providing a ground plane. In the embodiment of FIG. 8, the lateral location along shelf 60 of a particular item of interest may be determined. In various embodiments, more or fewer signal lines 62 may be used. Items having RFID tag 22 may be placed side-to-side on shelf 60. In such an embodiment, each one of signal lines 62 may be powered sequentially by at least one RFID reader 19. Powering of one of signal lines 62 may cause the remaining signal lines 62 that are not being powered at a given time to parasitically excite the electromagnetic field generated by the powered signal line. However, in some embodiments the non-powered signal lines 62 may be prevented from excitation by techniques well known in the art.

In embodiments where one or more of signal lines 62 are powered, a particular item of interest containing an RFID tag 22 may backscatter an RF signal through one or more of signal lines 62 to one or more RFID readers 19. The location along shelf 60 of a particular item of interest containing an RFID tag 22 can be determined based on which of signal lines 62 communicate backscattered RF signals to RFID reader 19. For example, assume a particular item of interest is placed on the right end of shelf 60. Signal lines 62 may then be powered sequentially. Signal line 62A may be powered first, while signal lines 62B-62N are prevented from parasitic excitation. The RFID tag 22 associated with the particular item of interest may not backscatter RF signals because RFID tag 22 may be beyond the range of the electromagnetic field generated by signal line 62A. This process may be repeated until an RFID reader connected to signal line 62N powers signal line 62N. When signal line 62N is powered, and the remaining signal lines 62 are prevented from resonating, RFID tag 22 may receive power from an electromagnetic field generated by signal line 38D and backscatter RF signals to reader 19 via signal line 62N. Similar to the description of FIG. 6, if multiple signal lines 62 backscatter an RF signal then reader 19 may use the signal strength associated with each of the signal lines 62 that backscattered an RF signal to determine lateral position, or alternatively select the middle of the set of signal lines 62 that backscattered an RF signal. In this manner, the location of the particular item of interest will be known to be in the right end of shelf 60.

The techniques described above describe powering signal lines 62 in a sequential fashion. However, other techniques may also be used. In one embodiment, each of signal lines 62 may be powered with a different RFID reader 19. The lateral location of a particular item of interest can be determined based on which RFID reader 19 receives backscattered RF signals from the RFID tag 22 of the particular item of interest. In another embodiment, a recursive method may be used to power only a first subset of signal lines 62 and then to determine if the particular item of interest has backscattered RF signals. If the particular item of interest has backscattered RF signals, then only sub-subset of the first subset of signal lines 62 may be powered, and the process is repeated until the lateral location of the particular item of interest can be determined. If the particular item of interest does not backscatter RF signals when the first subset of signal lines 62 are powered, then a second subset of signal lines 62 are powered to check whether the particular item of interest backscatters RF signals. The process repeats until the lateral location of the particular item of interest can be determined. In other embodiments, signal lines 62 may be powered in various other sequences.

Figure 9:
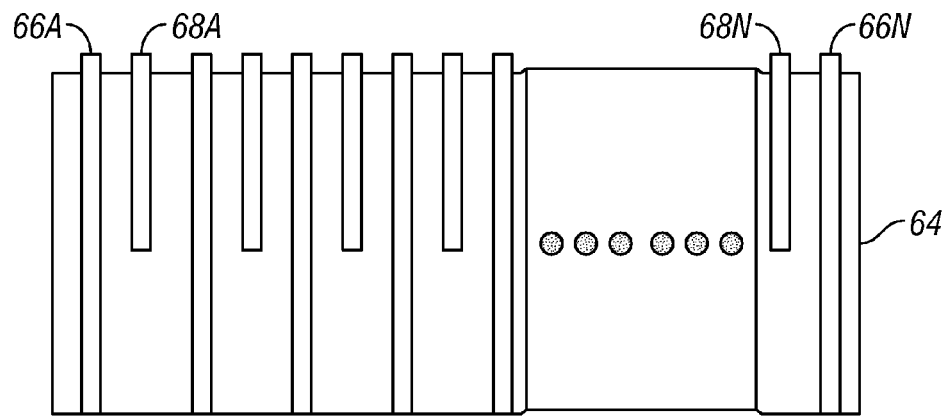
FIG. 9 is a schematic diagram illustrating an exemplary embodiment of a shelf containing a plurality of signal lines laid vertically in an alternating scheme where one signal line extends the entire width of the shelf, and another signal line that extends less than the entire width of the shelf.

FIG. 9 is a schematic diagram illustrating a top view of another exemplary embodiment of a shelf 64. Shelf 64 includes a plurality of signal lines 66A-66N (collectively, signal lines 66) extending longitudinally along the width of shelf 64. Shelf 64 also includes a plurality of signal lines 68A-68N (collectively, signal lines 68) extending longitudinally along less than the entire width of shelf 64. Though not shown, signal lines 66 and 68 may be terminated by a load connected to ground. As shown in the example of FIG. 9, the pluralities of signal lines 66 and 68 are laid out in an alternating scheme across the length of shelf 64. In one embodiment, signal lines 68 have a length that is half of the length of signal lines 66. In the embodiment of FIG. 9, the lateral location and the front-to-back location of a particular item of interest having an RFID tag 22 can be determined. Signal lines 66 and 68 may be powered sequentially by an RFID reader 19. For example, signal line 66A and signal line 68A may be powered first, followed by signal line 66B and signal line 68B. One of signal lines 66 and 68, which are powered, may receive backscattered RF signals from an RFID tag 22 of a particular device of interest. The lateral location of the item of interest along the length of shelf 64 may be determined based on which pair of signal lines 66 and 68 transmits backscattered RF signals from the particular item of interest. Once the location along the length of shelf 64 is determined, the location along the width (i.e., depth) of shelf 64 may be determined by turning off the power to one of the powered signal lines 66, and keeping the power on for one of the signal lines 68. If RFID tag 22 of the particular item of interest backscatters RF signals, then the location of the particular item of interest may be identified as within the front portion of shelf 64. If the particular item of interest does not backscatter RF signals, then the location of the particular item of interest may be identified as within the back portion of shelf 64. Similar to the description for FIG. 6 and FIG. 8, if multiple signal lines 66 and 68 backscatter an RF signal then reader 19 may use the signal strength associated with each of the signal lines 66 and 68 that backscattered an RF signal to determine the position, or alternatively select the middle of the set of signal lines 66 and 68 that backscattered an RF signal.

Figure 10:
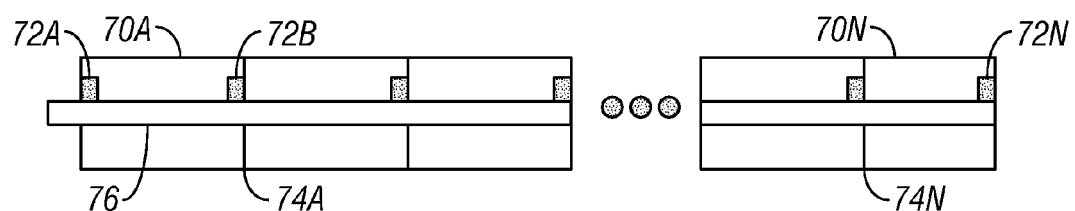
FIG. 10 is a schematic diagram illustrating an exemplary embodiment of a plurality of shelves connected together.

FIG. 10 is a schematic diagram of a side-view of an exemplary embodiment of a plurality of shelves 70A-70N (collectively, shelves 70) physically and electrically connected together to form a larger storage area. As an example, in large warehouses, multiple shelves 70 may be connected together since the amount of items with RFID tags 22 to be stored is greater than will fit on the length of one of shelves 70.

Shelves 70 may be physically and/or electrically connected together by connectors 74A-74N (collectively, connectors 74). Each one of shelves 70 may contain RFID reference tags 72A-72N (collectively, RFID reference tags 72) placed at the ends of shelves 70. RFID reference tags 72 may be placed in other locations of shelves 70 as well.

To find a particular item of interest in one of shelves 70, an RFID reader 19 may be connected to shelf 70A. Shelf 70N may be terminated by a load to ground. RFID reader 19 may power signal line 76 which extends across all of shelves 70. Signal line 76 may be made up of a plurality of shorter signal lines physically and/or electrically connected together by connectors 74. That is, connectors 74 may connect shelves 70 together, and may also connect a signal line of one of shelves 70 to another signal line of an adjacent shelf 70. In the embodiment of FIG. 10, RFID reader 19 may power the entire signal line 76 when looking for a particular item of interest based on the particular item of interest's associated RFID tag 22. Reader 19 may receive a response in the form of backscattered RF signals from every RFID tag 22 and RFID reference tag 72 on signal line 76. RFID reader 19 may receive the backscattered signals in a sequential fashion, such that RFID reader 19 first receives the backscattered RF signal from a RFID reference tag 72 associated with a one of shelves 70, followed by the backscattered RF signals from all RFID tags 22 associated with items placed on the shelf 70, followed by the backscattered RF signal from a RFID reference tag associated with the next shelf. The shelf 70 containing the particular item of interest may be determined by sifting through the sequential backscattered data and locating the particular item of interest, and determining which RFID reference tags 72 preceded and followed the RFID tag 22 associated with the particular item of interest. For example, assume the particular item of interest is located on shelf 70D, RFID reader 19 may receive backscattered RF signals from RFID reference tag 70D, followed by the RFID tag associated with the item of interest, and from RFID reference tag 70E. In this manner, it can be determined that the correct shelf containing the particular item of interest is shelf 70D.

Once the correct shelf 70 is determined, all the items on the shelf of interest may be set to a "quiet" state by transmitting a quiet command with RFID reader 19, as is known in the art. Specifically, all tags are placed in the quite state except: (1) the RFID tag for the item of interest, and (2) the RFID reference tag 72 for the identified shelf and optionally the RFID reference tag 72 for the following shelf. Thus, the only RFID tags 22 to respond on a subsequent check by RFID reader 19 would be one of RFID reference tags 72 associated with the particular shelf containing the particular item of interest and the RFID tag 22 associated with the particular item of interest.

RFID reader 19 may then use timed responses from the one of RFID reference tags 72 and the RFID tag 22 associated with the particular item of interest to determine the relative lateral location of the particular item of interest. In one embodiment, RFID reader may determine the response time of the RFID reference tag 72 associated with the particular shelf 70 containing the particular item of interest and the response time of the RFID reference tag 72 associated with the following shelf 70. RFID reader 19 may also determine the response time of the RFID tag 22 associated with the particular item of interest. Based on those three values, RFID reader 19 may determine the lateral position of the particular item of interest. For example, once again assume the particular item of interest is located on shelf 70D, RFID reader 19 may determine that the response time for RFID reference tag 72D is 10 seconds, and the response time for RFID reference tag 72E is 11 seconds. RFID reader 19 may determine that the response time for the RFID tag 22 associated with the particular item of interest is 10.5 seconds. In this manner, RFID reader 19 may determine that the particular item of interest is located approximately half-way on shelf 70D. In another embodiment, RFID reader 19 may have a pre-programmed table of time responses of RFID reference tags 72. In such embodiment, RFID reader 19 may only determine the time response of the particular item of interest. The lateral position of particular item of interest can be determined based on the time response and the table containing time responses of RFID reference tags 72.

Figure 11A:
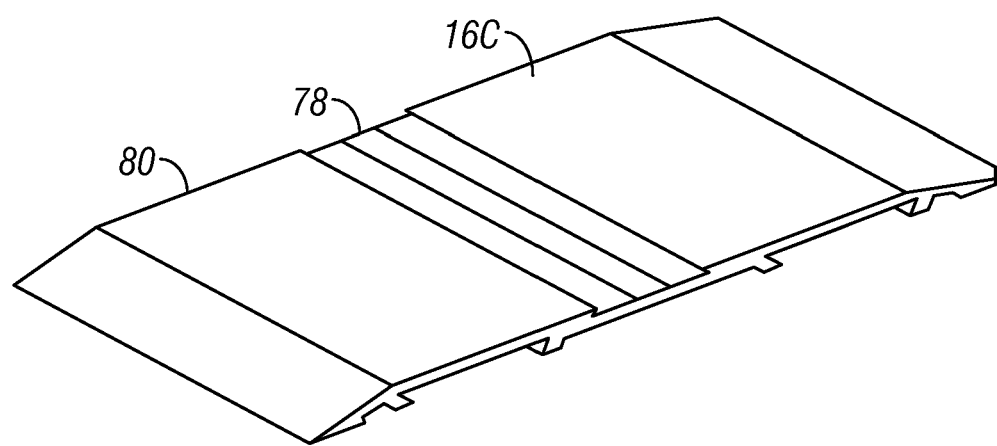
FIG. 11A is a perspective diagram illustrating an exemplary embodiment of a front side of a shelf.
Figure 11B:
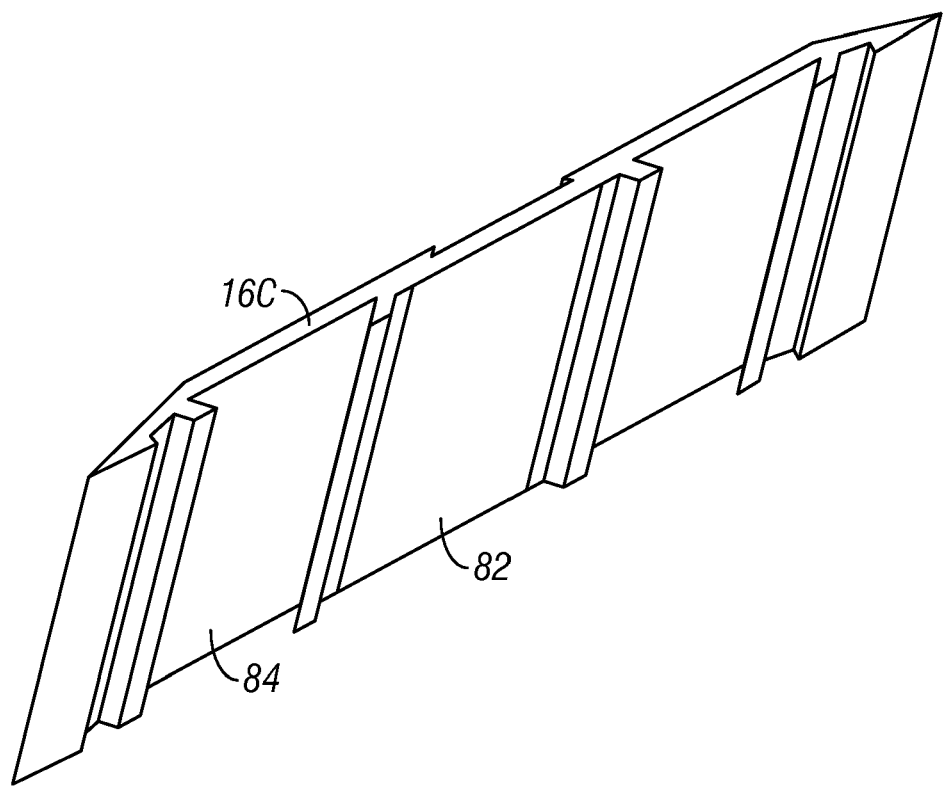
FIG. 11B is a perspective diagram illustrating an exemplary embodiment of a back side of a shelf.

FIGS. 11A and 11B are perspective diagrams illustrating a top view and a bottom view of an exemplary embodiment of shelf 16C, respectively. Shelf 16C may comprise an integrated assembly that includes an extruded antenna substrate having a top surface and a bottom surface. FIG. 11A illustrates signal line 78 and top surface 80 of shelf 16C. Signal line 78 may be regressed within top surface 80. FIG. 11B illustrates a ground plane 82 and bottom surface 84 of shelf 16C. As one example, ground plane 82 may be three times the width of signal line 78.

Figure 12:
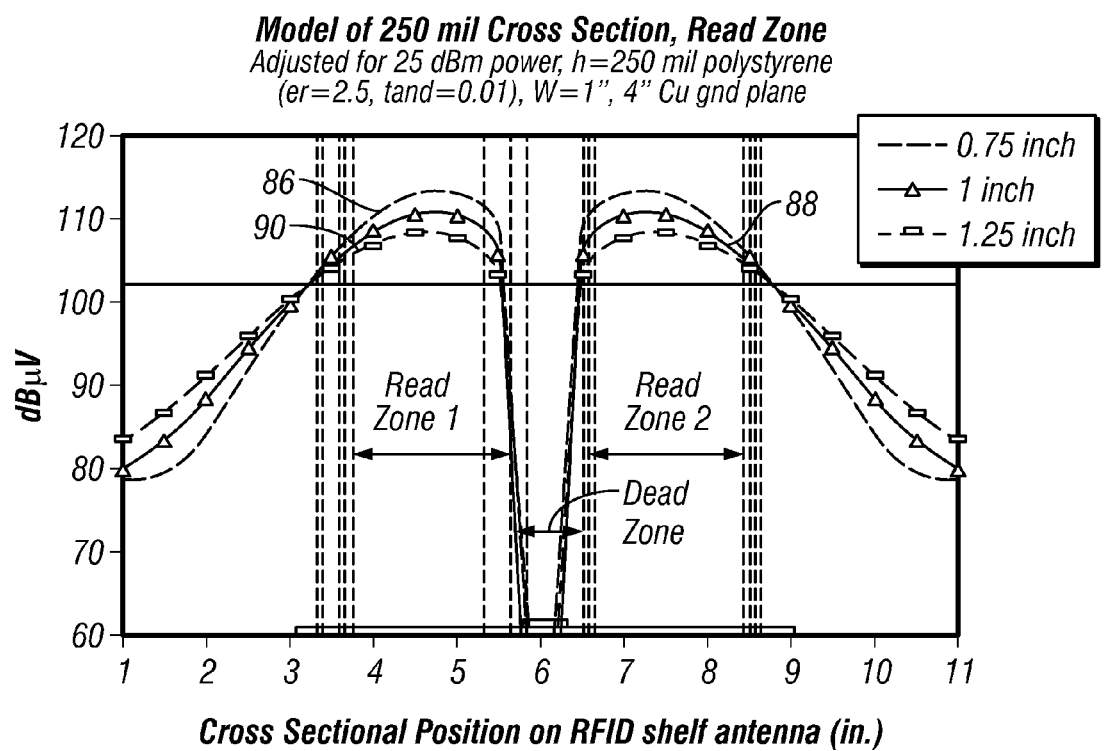
FIGS. 12-14 are graphs illustrating magnitudes of example electromagnetic fields produced by the signal line of FIG. 4.

FIG. 12 is a graph illustrating modeling results showing exemplary electromagnetic power levels expected to be generated by an exemplary shelf 16C (FIG. 4) across the length of a signal line 30, measured at various distances above shelf 16C. The modeling results shown in FIG. 12 were computed assuming a substrate 32 composed of 250 mils (6.35 mm) of polystyrene, a signal line 30 of 1 inch (25.4 mm) in width and 11 inches (279.4 mm) in length, and a ground plane 34 of 4 inches (101.6 mm) in width and 11 inches (279.4 mm) in length. Signal line 30 on shelf 16C may generate an electromagnetic field of different power levels at different positions of signal line 30.

For example, between cross-sectional positions of shelf 16C of 1 inch (25.4 mm) and 3.5 inches (88.9 mm), at a distance of 0.75 inches (19 mm) above signal line 30 (86), the electromagnetic power increases from about 80 dBµV to above 100 dBµV. Then between cross-sectional positions of shelf 16C of 3.5 inches (88.9 mm) and 5.8 inches (147.3 mm), the electromagnetic power increases to a maximum of about 113 dBµV at a cross-sectional position of about 4.8 inches (121.9 mm), and then starts to decrease until the electromagnetic power is close to 60 dBµV at a cross-sectional position of about 5.8 inches (147.3 mm). Between cross-sectional positions of shelf 16C of 5.8 inches (147.3 mm) and 6.2 inches (157.5 mm) the electromagnetic power remains less than 60 dBµV. Between cross-sectional position of 6.2 inches (157.5 mm) and about 6.5 inches (165.1 mm) the electromagnetic power increases to above 100 dBµV. Between cross-sectional position of 6.5 inches (165.1 mm) and about 8.5 inches (215.9 mm), the electromagnetic power increases to a maximum of about 113 dBµV at cross-sectional position of about 7.5 inches (190.5) and then decreases until the power is about 80 dBµV at cross-sectional position of 11 inches (279.4 mm).

At a distance of 1 inch (25.4 mm) above signal line 30 (88), between cross-sectional positions of shelf 16C of 1 inch (25.4 mm) and 3.5 inches (88.9 mm), the electromagnetic power increases from about 80 dBµV to above 100 dBµV. Then between cross-sectional positions of shelf 16C of 3.5 inches (88.9 mm) and 5.8 inches (147.3 mm), the electromagnetic power increases to a maximum of about 112 dBµV at a cross-sectional position of about 4.8 inches (121.9 mm), and then starts to decrease until the electromagnetic power is close to 60 dBµV at a cross-sectional position of about 5.8 inches (147.3 mm). Between cross-sectional positions on shelf 16C of 5.8 inches (147.3 mm) and 6.2 inches (157.5 mm) the electromagnetic power remains less than 60 dBµV. Between cross-sectional positions on shelf 16C of 6.2 inches (157.5 mm) and about 6.5 inches (165.1 mm) the electromagnetic power increases to above 100 dBµV. Between cross-sectional positions on shelf 16C of 6.5 inches (165.1 mm) and about 8.5 inches (215.9 mm), the electromagnetic power increases to a maximum of about 112 dBµV at a cross-sectional position of about 7.5 inches (190.5 mm) and then decreases until the power is about 80 dBµV at a cross-sectional position of 11 inches (279.4 mm).

At a distance of 1.25 inches (31.7 mm) above signal line 30 (90), between cross-sectional position of shelf 16C of 1 inch (25.4 mm) and 3.5 inches (88.9 mm), the electromagnetic power increases from about 80 dBµV to above 100 dBµV. Then between a cross-sectional positions of shelf 16C of 3.5 inches (88.9 mm) and 5.8 inches (147.3 mm), the electromagnetic power increases to a maximum of about 108 dBµV at a cross-sectional position of about 4.8 inches (121.9 mm), and then starts to decrease until the electromagnetic power is close to 60 dBμV at a cross-sectional position of about 5.8 inches (147.3 mm). Between a cross-sectional position of 5.8 inches (147.3 mm) and 6.2 inches (157.5 mm) the electromagnetic power remains less than 60 dBμV. Between a cross-sectional position of 6.2 inches (157.5 mm) and about 6.5 inches (165.1 mm) the electromagnetic power increases to above 100 dBμV. Between a cross-sectional position of 6.5 inches (165.1 mm) and about 8.5 inches (215.9 mm), the electromagnetic power increases to a maximum of about 108 dBμV at a cross-sectional position of about 7.5 inches (190.5 mm) and then decreases until the power is about 80 dBμV at 11 inches (279.4 mm).

Figure 13:
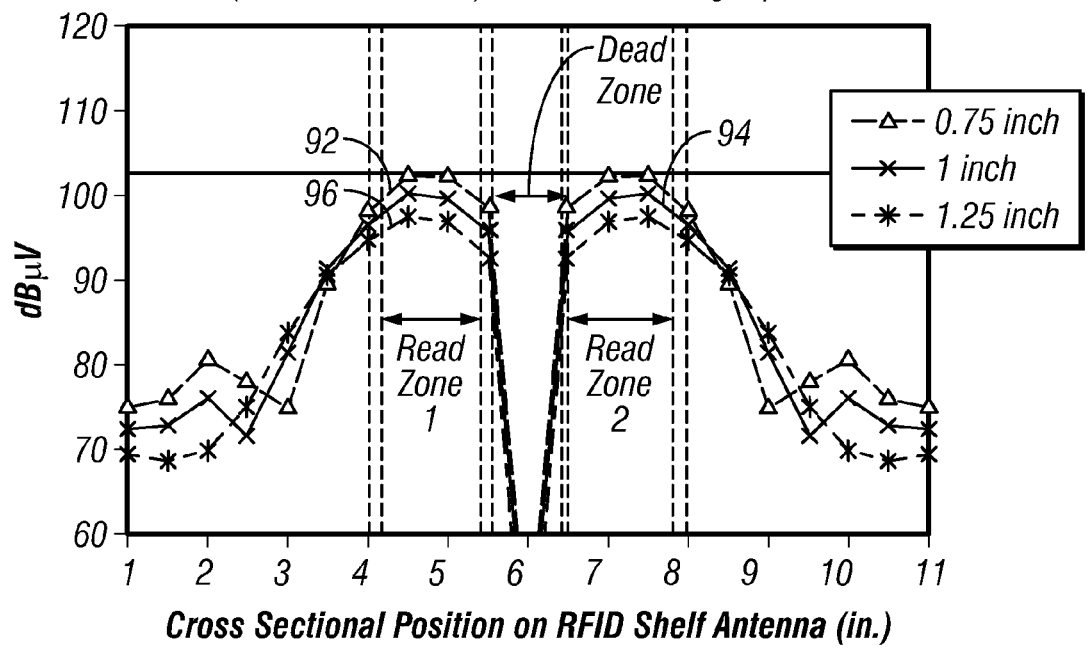

FIG. 13 is a graph illustrating exemplary electromagnetic power levels generated by a second embodiment of an exemplary shelf 16C (FIG. 4) across the length of a signal line 30, measured at various distances above shelf 16C. The modeling results shown in FIG. 12 where computing using a substrate 32 composed of 60 mils (1.52 mm) of polystyrene, a signal line 30 of 0.25 inches (6.35 mm) in width and 11 inches (279.4 mm) in length, and a ground plane 34 of 4 inches (101.6 mm) in width and 11 inches (279.4 mm) in length.

Signal line 30 on shelf 16C may generate an electromagnetic field of different power levels at different positions of signal line 30. For example, between cross-sectional positions of shelf 16C of 1 inch (25.4 mm) and 4 inches (101.6 mm), at a distance of 0.75 inches (19 mm) above signal line 30 (92), the electromagnetic power increases from about 75 dBμV to a little under 100 dBμV. Then between cross-sectional positions of 4 inches (101.6 mm) and 5.8 inches (147.3 mm), the electromagnetic power increases to a maximum of about 102 dBμV at a cross-sectional position of about 5 inches (127 mm), and then starts to decrease until the electromagnetic power is close to 60 dBμV at a cross-sectional position of about 5.8 inches (147.3 mm). Between cross-sectional positions of 5.8 inches (147.3 mm) and 6.2 inches (157.5 mm) the electromagnetic power remains less than 60 dBμV. Between cross-sectional positions of 6.2 inches (157.5 mm) and about 6.5 inches (165.1 mm) the electromagnetic power increases to a little under 100 dBμV. Between cross-sectional positions of 6.5 inches (165.1 mm) and about 8 inches (203.2 mm), the electromagnetic power increases to a maximum of about 102 dBμV at a cross-sectional position of about 7.5 inches (190.5 mm) and then decreases until the power is about 75 dBμV at a cross-sectional position of 11 inches (279.4 mm).

At a distance, 1 inch (25.4 mm) above signal line 30 (94), between cross-sectional positions of shelf 16C of 1 inch (25.4 mm) and 4 inches (101.6 mm), the electromagnetic power increases from about 74 dBμV to a little under 100 dBμV. Then between cross-sectional positions of 4 inches (101.6 mm) and 5.8 inches (147.3 mm), the electromagnetic power increases to a maximum of about 100 dBμV at a cross-sectional position of about 5 inches (127 mm), and then starts to decrease until the electromagnetic power is close to 60 dBμV at about a cross-sectional position of 5.8 inches (147.3 mm). Between cross-sectional positions of 5.8 inches (147.3 mm) and 6.2 inches (157.5 mm) the electromagnetic power remains less than 60 dBμV. Between cross-sectional positions of 6.2 inches (157.5 mm) and about 6.5 inches (165.1 mm) the electromagnetic power increases to a little under 100 dBμV. Between cross-sectional positions of 6.5 inches (165.1 mm) and about 8 inches (203.2 mm), the electromagnetic power increases to a maximum of about 102 dBμV at a cross-sectional position of about 7.5 inches (190.5 mm) and then decreases until the power is about 80 dBμV at a cross-sectional position of 11 inches (279.4 mm).

At a distance 1.25 inches above signal line 30 (96), between cross-sectional positions of 1 inch (25.4 mm) and 4 inches (101.6 mm), the electromagnetic power increases from about 70 dBμV to about 95 dBμV. Then between cross-sectional positions of 4 inches (101.6 mm) and 5.8 inches (147.3 mm), the electromagnetic power increases to a maximum of about 97 dBμV at a cross-sectional position of about 4.8 inches (121.2 mm), and then starts to decrease until the electromagnetic power is close to 60 dBμV at a cross-sectional position of about 5.8 inches (147.3 mm). Between cross-sectional positions 5.8 inches (147.3 mm) and 6.2 inches (157.5 mm) the electromagnetic power remains less than 60 dBμV. Between cross-sectional positions of 6.2 inches (157.5 mm) and about 6.5 inches (165.1 mm), the electromagnetic power increases to about 95 dBμV. Between cross-sectional positions of 6.5 inches (165.1 mm) and about 8 inches (203.2 mm), the electromagnetic power increases to a maximum of about 97 dBμV at about a cross-sectional position of 7.5 inches (190.5 mm) and then decreases until the power is about 80 dBμV at a cross-sectional position of 11 inches (279.4 mm).

Figure 14:
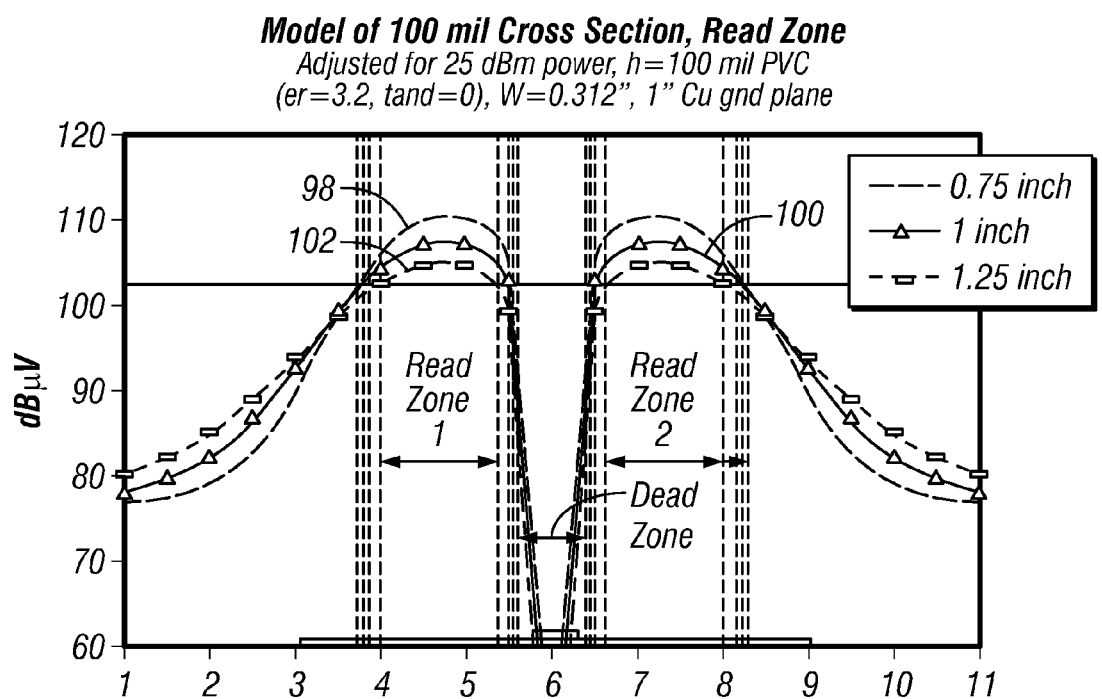

FIG. 14 is a graph illustrating an exemplary electromagnetic power levels generated by a third embodiment of exemplary shelf 16C (FIG. 4). The modeling results shown in FIG. 14 are based on a substrate 32 of 100 mils (2.54 mm) of polystyrene, signal line 30 is 0.312 inches (7.92 mm) in width and 11 inches (279.4 mm) in length, and ground plane 34 is 1 inch (25.4 mm) in width and 11 inches (279.4 mm) in length. Signal line 30 on shelf 16C may generate an electromagnetic field of different power levels at different positions of signal line 30. For example, between cross-sectional positions of shelf 16C of 1 inch (25.4 mm) and 3.8 inches (96.5 mm), at a length 0.75 inches (19 mm) above signal line 30 (98), the electromagnetic power increases from about 80 dBμV to above 100 dBμV. Then between cross-sectional positions of 3.8 inches (96.5 mm) and 5.8 inches (147.3 mm), the electromagnetic power increases to a maximum of about 111 dBμV at a cross-sectional position of about 4.8 inches (121.2 mm), and then starts to decrease until the electromagnetic power is close to 60 dBμV at a cross-sectional position of about 5.8 inches (147.3 mm). Between cross-sectional positions 5.8 inches (147.3 mm) and 6.2 inches (157.5 mm) the electromagnetic power remains less than 60 dBμV. Between cross-sectional positions of 6.2 inches (157.5 mm) and about 6.5 inches (165.1 mm) the electromagnetic power increases to above 100 dBμV. Between across-sectional positions of 6.5 inches (165.1 mm) and about 8.2 inches (208.3 mm), the electromagnetic power increases to a maximum of about 111 dBμV at a cross-sectional position of about 7.5 inches (190.5 mm) and then decreases until the power is about 80 dBμV at a cross-sectional position of 11 inches (279.4 mm).

At a distance of 1 inch above signal line 30 (100), between cross-sectional positions of shelf 16C of 1 inch (25.4 mm) and 3.8 inches (96.5 mm), the electromagnetic power increases from about 80 dBμV to above 100 dBμV. Then between cross-sectional positions of 3.8 inches (96.5 mm) and 5.8 inches (147.3 mm), the electromagnetic power increases to a maximum of about 105 dBμV at a cross-sectional position of about 4.8 inches (121.2 mm), and then starts to decrease until the electromagnetic power is close to 60 dBμV at a cross-sectional position of about 5.8 inches (147.3 mm). Between cross-sectional positions of 5.8 inches (147.3 mm) and 6.2 inches (157.5 mm) the electromagnetic power remains less than 60 dBμV. Between cross-sectional positions of 6.2 inches (157.5 mm) and about 6.5 inches (165.1 mm) the electromagnetic power increases to above 100 dBμV. Between cross-sectional positions of 6.5 inches (165.1 mm) and about 8.5 inches (215.9 mm), the electromagnetic power increases to a maximum of about 105 dBμV at a cross-sectional position of about 7.5 inches (190.5 mm) and then decreases until the power is about 80 dBμV at 11 inches (279.4 mm).

At a distance of 1.25 inches above signal line 30 (102), between cross-sectional positions of shelf 16C of 1 inch (25.4 mm) and 3.8 inches (96.5 mm), the electromagnetic power increases from about 80 dBμV to above 100 dBμV. Then between 3.8 inches (96.5 mm) and 5.8 inches (147.3 mm), the electromagnetic power increases to a maximum of about 103 dBμV at a cross-sectional position of about 4.8 inches (121.2 mm), and then starts to decrease until the electromagnetic power is close to 60 dBμV at a cross-sectional position of about 5.8 inches (147.3 mm). Between cross-sectional positions of 5.8 inches (147.3 mm) and 6.2 inches (157.5 mm) the electromagnetic power remains less than 60 dBμV. Between cross-sectional positions of 6.2 inches (157.5 mm) and about 6.5 inches (165.1 mm) the electromagnetic power increases to above 100 dBμV. Between cross-sectional positions of 6.5 inches (165.1 mm) and about 8.5 inches (215.9 mm), the electromagnetic power increases to a maximum of about 103 dBμV at a cross-sectional position of about 7.5 inches (190.5 mm) and then decreases until the power is about 80 dBμV at 11 inches (279.4 mm).

As can be seen by FIGS. 12-14, various embodiments of shelf 16C having signal line structures can extend near field components of radio frequency (RF) electromagnetic fields to substantial distances (e.g., substantially greater than 15 mm) to power RFID tags 22 placed at varying distances above signal line 30 in an RFID system 10. By varying the characteristic of signal line 30, ground plane 34, and substrate 32, the power of the electromagnetic field may be optimized for particular RFID systems 10. In this manner, RFID tags 22 associated with a folder, box, or the like, placed at varying distances above signal line 30 may be powered by near field component of an electromagnetic field generated by the signal line 30 electrically coupled to ground plane 34, when powered by RFID reader 19 in RFID system 10.

In one embodiment, a method for detecting the presence of a particular item of interest within a radio frequency identification (RFID) system, comprises: outputting a first output signal from an RFID reader to a signal line structure of an RFID-enabled shelf to generate a radio frequency (RF) electromagnetic field for interrogating one or more of the RFID tags associated with items located on the shelf, the signal line structure comprising a first signal line affixed to a first side of the shelf, an electrical conductor providing an electrical ground plane on a second side of the substrate opposite the signal line and an electrical load coupling the signal line and ground plane; receiving a response RF signal from at least one of the RFID tags via the signal line structure; and determining, based on the response RF signal, whether an item of interest is stored on the shelf.

The method may further require that the signal line structure comprises a plurality of signal lines, the method further comprising outputting a second output signal to the signal line structure to create a second RF electromagnetic field substantially along a second one of the signal lines; determining a location of the item on the shelf up based on whether the response RF signal is received via the first signal line in response to the first output signal or via the second signal line in response to the second output signal.

The method may further require that plurality of signal lines extend longitudinally along a length of the shelf, and wherein determining a location comprises determining a depth that the item is positioned on the shelf.

The method may further require that plurality of signal lines extend across a width of the shelf along a direction from a front of the shelf to a back of the shelf, and wherein determining a location comprises determining a longitudinal position for the item along the length of the shelf.

The method may further require that the signal line structure of the shelf comprises a plurality of signal lines, the method further comprising: powering a subset of the plurality of signal lines to create respective electromagnetic fields along each of the first subset of the signal lines; and while powering the first subset of the plurality of signal lines, electrically coupling the signal lines that are not powered to ground to prevent the signal lines from resonating the electromagnetic fields created by the powered signal lines.

The method, further comprises: selecting a first load at a first location along the signal line and activating a switch to electrically couple the signal line to the ground plane through the first load at the first location; outputting the first signal to energize the signal line to create the RF electromagnetic field along the signal line substantially up to the first location; selecting a second load at a second location along the signal line and activating a second switch to electrically couple the signal line to the ground plane through the second load at the second location; outputting a second signal from the RFID reader to the signal line antenna to energize the signal line to create the RF electromagnetic field along the signal line substantially up to the second location; and determining a location the item of interest on the shelf up based on whether the response RF signal is received in response to the first signal or the second signal.

The method may further require that the substrate includes a plurality of different dielectric materials positioned laterally along the shelf and at known locations on the shelf, and wherein outputting the signal comprises repeatedly setting a power level of the signal output to an increased power level until the RF response signal is received from the item; and identifying a position of the particular item of interest based on the power level at which the RF response signal is received.

The method may further require that the substrate includes a plurality of different dielectric materials positioned laterally along the shelf and at known locations on the shelf, and wherein outputting the signal comprises repeatedly setting a power level of the signal output to a decreased power level until the RF response signal is not received from the item; and identifying a position of the particular item of interest based on the power level at which the RF response signal is not received.

The method, may further comprise: providing a plurality of shelves, wherein each of the plurality of shelves comprises an RFID reference tag on each shelf; determining which of the plurality of shelves contains the particular item of interest based on a sequential list of the backscattered RF signal of an RFID reference tag associated with a shelf containing the particular item of interest, the particular item of interest, and RFID reference tag associated with a shelf following the shelf containing the particular item of interest; setting all items on the shelf containing the particular item of interest to a quiet state, such that upon a subsequent query by the RFID reader only the RFID reference tag associated with the shelf containing the particular item of interest, the particular item of interest, and the RFID reference tag associated with a shelf following the shelf containing the particular item of interest backscatter an RF signal; receiving backscattered RF signals from the particular item of interest, the RFID reference tag associated with the shelf containing the particular item of interest, the particular item of interest, and the RFID reference tag associated with the shelf following the shelf containing the particular item of interest.

In another embodiment, a method for identifying the lateral position on a shelf of a particular item of interest within a radio frequency identification (RFID) system comprises: powering each of a plurality of signal lines of a signal line structure with at least one reader, wherein each of the plurality of signal lines are different in length, extending longitudinally along the length of the shelf; determining which of the plurality of signal lines backscatters a radio frequency (RF) signal from an RFID tag associated with a particular item of interest; identifying a position of a particular item of interest based on an end location of a signal line of the plurality of signal lines having a shortest length that backscattered the RF signal from the RFID tag associated with the particular item of interest, and an end location of a signal line of the plurality of signal lines having a next shortest length from the signal line having the shorted length that backscattered the RF signal from the RFID tag associated with the particular item of interest.

The method may further require that powering each of the plurality of signal lines comprises simultaneously powering each of the plurality of signal lines on the shelf.

The method may further require that powering each of the plurality of signal lines comprises sequentially powering each of the plurality of signal lines on the shelf.

Various embodiments of the invention have been described. These and other embodiments are within the scope of the following claims.

The invention claimed is:

1. A radio frequency identification (RFID)-enabled shelf comprising:
   a substrate providing a shelf for items having RFID tags; and
   a signal line structure comprising:
      a plurality of signal lines affixed to a first side of the substrate to generate one or more radio frequency (RF) electromagnetic fields for interrogating one or more of the RFID tags, wherein the plurality of signal lines extend longitudinally along the shelf;
      an electrical conductor providing an electrical ground plane on a second side of the substrate opposite the plurality of signal lines, wherein the electrical ground plane extends longitudinally along the length of the substrate; and
      an electrical load coupling at least one of the plurality of signal lines and the ground plane.

2. The RFID enabled-shelf of claim 1, wherein the ground plane has a width that is at least twice a width of the signal line.

3. The RFID enabled-shelf of claim 1, wherein the ground plane has a width that is at least four times a width of the signal line.

4. The RFID enabled-shelf of claim 1, wherein the signal lines have a width of at least 0.312 inches (7.92 mm) and the ground plane has a width of at least 1 inch (25.4 mm) in width.

5. The RFID enabled-shelf of claim 1, wherein the signal lines have a width of at least 1.0 inches (25.4 mm) and the ground plane has a width of at least 4 inch (101.6 mm) in width.

6. The RFID-enabled shelf of claim 1, further comprising a first connector connected to a first end of a signal line of the plurality of signal lines and a second connector connected to a second end of the signal line to electrically couple the signal line structure of the RFID enabled shelf to signal line structures of one or more additional shelves.

7. The RFID-enabled shelf of claim 1, wherein the signal lines and the ground plane comprise a copper tape affixed to the substrate.

8. The RFID-enabled shelf of claim 1, wherein the electrical load coupling the at least one of the plurality of signal lines and ground plane is a 50 ohm resistor.

9. The RFID-enabled shelf of claim 1, further comprising an electrical connector for electrically coupling the at least one of the plurality of signal lines to an RFID reader.

10. A radio frequency identification (RFID)-enabled shelf comprising:
    a substrate providing a shelf for items having RFID tags; and
    a signal line structure comprising:
       a plurality of signal lines affixed to a first side of the substrate to generate one or more radio frequency (RF) electromagnetic fields for interrogating one or more of the RFID tags;
       an electrical conductor providing an electrical ground plane on a second side of the substrate opposite the plurality of signal lines; and
       an electrical load coupling at least one of the plurality of signal lines and the ground plane;
       wherein the plurality of signal lines are substantially equally spaced apart and located at different depths of the shelf.

11. A radio frequency identification (RFID)-enabled shelf comprising:
    a substrate providing a shelf for items having RFID tags; and
    a signal line structure comprising:
       a plurality of signal lines affixed to a first side of the substrate to generate one or more radio frequency (RF) electromagnetic fields for interrogating one or more of the RFID tags;
       an electrical conductor providing an electrical ground plane on a second side of the substrate opposite the plurality of signal lines; and
       an electrical load coupling at least one of the plurality of signal lines and the ground plane,
       wherein at least one of the plurality of signal lines is a parasitic signal line that is not electrically coupled to the ground plane.

12. The RFID-enabled shelf of claim 1, wherein all of the plurality of signal lines extend longitudinally along substantially an entire length of the shelf.

13. The RFID-enabled shelf of claim 1,
    wherein a first subset of the plurality of signal lines extends longitudinally along substantially an entire length of the shelf, and
    wherein a second subset of the plurality of signal lines extends longitudinally along only a partial length of the shelf.

14. The RFID-enabled shelf of claim 1, wherein the plurality of signal lines comprises signal lines that each extend to a different longitudinal position along a length of the shelf.

15. A radio frequency identification (RFID)-enabled shelf comprising:
    a substrate providing a shelf for items having RFID tags; and
    a signal line structure comprising:
       a plurality of signal lines affixed to a first side of the substrate to generate one or more radio frequency (RF) electromagnetic fields for interrogating one or more of the RFID tags;
       an electrical conductor providing an electrical ground plane on a second side of the substrate opposite the plurality of signal lines; and an electrical load coupling at least one of the plurality of signal lines and the ground plane
wherein the plurality of signal lines extend along a width of the shelf in a direction from a front of the shelf to a back of the shelf,
wherein the plurality of signal lines are substantially equally spaced a lateral distance apart along a length of the shelf and are configured for selective powering for determining a longitudinal position of an item placed on the shelf.

16. A radio frequency identification (RFID) system, comprising:
a plurality of RFID-enabled shelves for storing items having RFID tags, each of the shelves having a substrate and signal line structure that includes a plurality of signal lines on a first side of the substrate to generate one or more radio frequency (RF) electromagnetic fields for interrogating one or more of the RFID tags and an electrical conductor providing an electrical ground plane on a second side of the substrate opposite the plurality of signal lines, wherein the plurality of signal lines extend longitudinally along each of the shelves, and further wherein the electrical ground plane extends longitudinally along each of the shelves; and
an electrical load coupling at least one of the plurality of signal lines of a last one of the shelves to the ground plane of the last shelf,
wherein each of the shelves is physically connected to at least one adjacent shelf,
wherein at least one of the plurality of signal lines of each of the shelves is coupled to at least one of the plurality of signal lines of at least one adjacent shelf, and
wherein the ground plane of each of the shelves is coupled to a ground plane of at least one adjacent shelf.

17. The signal line structure of claim 16, wherein at least one of the plurality of signal lines of a first one of the shelves is capable of being physically and electrically coupled to an RFID reader.

18. A radio frequency identification (RFID) system comprising:
an RFID reader;
a radio frequency identification (RFID)-enabled shelf electrically coupled to the RFID reader to generate a radio frequency (RF) electromagnetic field when powered by the RFID reader, the RFID-enabled shelf comprising:
a substrate providing a shelf for items having RFID tags;
a signal line structure comprising:
a plurality of signal lines affixed to a first side of the substrate to generate one or more radio frequency (RF) electromagnetic fields for interrogating one or more of the RFID tags;
an electrical conductor providing an electrical ground plane on a second side of the substrate opposite the plurality of signal lines, wherein the plurality of signal lines extend longitudinally along the substrate and wherein the ground plane extends longitudinally along the second side of the substrate; and
an electrical load coupling at least one of the plurality of signal lines and ground plane.

19. A method for detecting the presence of a particular item of interest within a radio frequency identification (RFID) system, comprising:
outputting a first output signal from an RFID reader to a signal line structure of an RFID-enabled shelf to generate one or more radio frequency (RF) electromagnetic fields for interrogating one or more of the RFID tags associated with items located on a shelf, the signal line structure comprising a plurality of signal lines affixed to a first side of the shelf, the plurality of signal lines extending longitudinally along the shelf, an electrical conductor providing an electrical ground plane on a second side of the substrate opposite the plurality of signal lines, the electrical ground plane extending longitudinally along the second side of the substrate, and an electrical load coupling at least one of the plurality of signal lines and ground plane, wherein the first output signal is outputted to a first signal line of the plurality of signal lines;
receiving a response RF signal from at least one of the RFID tags via the signal line structure; and
determining, based on the response RF signal, whether an item of interest is stored on the shelf.

20. The method of claim 19, wherein the first output signal creates a first RF electromagnetic field substantially along the first signal line of the plurality of signal lines, the method further comprising:
outputting a second output signal to the signal line structure to create a RF electromagnetic field substantially along a second signal line of the plurality of signal lines;
determining a location of the item on the shelf up based on whether the response RF signal is received via the first signal line in response to the first output signal or via the second signal line in response to the second output signal.

21. The method of claim 19, wherein determining a location comprises determining a depth that the item is positioned on the shelf.

* * * * *